US012730293B2

(12) United States Patent
Wood

(10) Patent No.: US 12,730,293 B2
(45) Date of Patent: Sep. 8, 2026

(54) SYSTEM AND METHODS OF MULTIPLE FLUOROPHORE VISUALIZATION

(71) Applicant: SYNAPTIVE MEDICAL INC., Toronto (CA)

(72) Inventor: Michael Frank Gunter Wood, Toronto (CA)

(73) Assignee: SYNAPTIVE MEDICAL INC.

( * ) Notice: Subject to any disclaimer, the term of this patent is extended or adjusted under 35 U.S.C. 154(b) by 364 days.

(21) Appl. No.: 18/466,980

(22) Filed: Sep. 14, 2023

(65) Prior Publication Data

US 2024/0085682 A1 Mar. 14, 2024

Related U.S. Application Data

(60) Provisional application No. 63/406,355, filed on Sep. 14, 2022, provisional application No. 63/406,352, filed on Sep. 14, 2022.

(51) Int. Cl.
*G02B 21/00* (2006.01)

(52) U.S. Cl.
CPC ..... *G02B 21/0076* (2013.01); *G02B 21/0012* (2013.01); *G02B 21/0044* (2013.01); *G02B 21/006* (2013.01); *G02B 21/008* (2013.01)

(58) Field of Classification Search
CPC ............ G02B 21/0076; G02B 21/0012; G02B 21/0044; G02B 21/006; G02B 21/008; G02B 21/16; G02B 21/361
See application file for complete search history.

(56) References Cited

U.S. PATENT DOCUMENTS

| | | | | |
|---|---|---|---|---|
| 8,672,838 B2 * | 3/2014 | McDowall | A61B 1/051 600/176 |
| 2004/0114219 A1 * | 6/2004 | Richardson | G01J 3/36 359/368 |
| 2008/0004533 A1 * | 1/2008 | Jansen | A61B 5/415 600/476 |
| 2009/0045353 A1 * | 2/2009 | Alexeevich | G01N 21/6486 250/482.1 |
| 2016/0220324 A1 * | 8/2016 | Tesar | A61B 90/20 |
| 2022/0031422 A1 | 2/2022 | Wood et al. | |

FOREIGN PATENT DOCUMENTS

| | | |
|---|---|---|
| CN | 111239998 | 6/2022 |
| WO | 2021263159 | 12/2021 |

OTHER PUBLICATIONS

Cleary, Kevin and Peters, Terry M., Image-Guided Interventions: Technology Review and Clinical Applications, Chapter 2, Annu. Rev. Biomed. Eng. 2010.12:119-142.

Search report issued by the Intellectual Property Office of the UK in relation to GB Application No. GB2314082.5 dated Mar. 13, 2024, 1 pg.

* cited by examiner

*Primary Examiner* — Mustak Choudhury

(57) ABSTRACT

Imaging systems and methods of multiple fluorophore visualization involving a videoscope. According to embodiments of the disclosure simultaneous visualization of each fluorophore the spatial distribution of fluorophores could be separately visualized by fusing the images and colouring each fluorophore differently. The distribution of each fluorophore could allow for Boolean logic on the fluorescence singles where the combination of fluorophores detected in each pixel is indicative of the state of the tissue.

20 Claims, 16 Drawing Sheets

Multiple Fluorophore Visualization

Multiple Fluorophon Visualization

Use single excitation source, multiple fluorophons.

Using multiple excitation sources, multiple fluorophons.

Visualize all fluorophones simultaneously, pseudo colour or real colour.

Use spatial overlap to determine clinical status.

Fluoro 1 = State A

Fluoro 1 + Fluoro 2 = State B

Fluoro 2 + Fluoro 3 = State C

Fluoro 1 + Fluoro 2 + Fluoro 3 = State B

Could determine things like tumours, tumour grade, tumour subtype, etc.

Ex. PPIX, fluoressence, ICG for tumours.

SYSTEM AND METHODS OF MULTIPLE FLUOROPHORE VISUALIZATION

CROSS-REFERENCE TO RELATED APPLICATION(S)

The document is a Nonprovisional patent application claiming the benefit of, and priority to, U.S. Provisional Patent Application Ser. No. 63/406,355, entitled "SYSTEM AND METHODS OF MULTIPLE FLUOROPHORE VISUALIZATION," filed on Sep. 14, 2022, and U.S. Provisional Patent Application Ser. No. 63/406,352, entitled "SYSTEM AND METHODS OF CONCURRENT WHITE LIGHT AND VISIBLE FLUORESCENCE VISUALIZATION," filed on Sep. 14, 2022, all of which are hereby incorporated by reference in their entirety.

FIELD

The present disclosure generally relates to microscopes having dual zoom optics and dual field-of-view imaging. The present disclosure more specifically relates to a microscope for use during image guided medical procedures.

BACKGROUND

In the related art, surgical microscopes are often used during surgical procedures to provide a detailed or magnified view of the surgical site during a medical procedure. Single-channel imaging systems typically do not provide stereoscopic video images; however, single-channel microscopes may be preferable to stereoscopic microscopes for certain functions.

Simultaneously visualizing white light and fluorescent light can provide the most useful image for surgery; however, for fluorophores that emit light in a visible wavelength range, visualization is challenging, in the related art, as the fluorescence signal is mixed with the white light signal. Therefore, a long-felt need exists for improving simultaneous visualization of a plurality of fluorophores.

SUMMARY

The present disclosure provides solutions for the challenges experienced in the related art in imaging systems and methods for simultaneously visualizing a plurality of fluorophores. The imaging system comprises one or more cameras; a filter feature in optical communication with the cameras, the filter feature configured to independently filter or tandemly filter light from each camera; an independently adjustable aperture in optical communication with the filter feature, the independently adjustable aperture configured to limit transmission of filtered light; independently adjustable zoom features in optical communication with the independently adjustable aperture, the independently adjustable zoom features including corresponding independently adjustable zoom channels, and each independently adjustable zoom feature configured to independently zoom independently limited filtered light; a prism in optical communication with the independently adjustable zoom channels, the prism configured to redirect independently zoomed, independently limited, filtered light; and a shared focus feature in optical communication with the prism, the shared focus feature comprising a shared focus channel, and the shared focus feature configured to focus redirected, independently zoomed, independently limited, filtered light.

According to embodiments of the present disclosure, simultaneous visualization of each fluorophore the spatial distribution of fluorophores could be separately visualized by fusing the images and differently colouring each fluorophore. The systems and methods of the present disclosure further involve using a controller or processor operable by way of a set of executable instructions storable in relation to a nontransient memory, e.g., a memory device. The set of executable instructions comprise an instruction for applying Boolean logic to data relating to each fluorophore of a plurality of fluorophores disposed in a spatial distribution, wherein combined data relating to at least one fluorophore, detected in each pixel of a plurality of pixels in an image, is used to indicate of a state of tissue, e.g., by an instruction for analyzing the combined data for each pixel of the plurality of pixels in the image. For example, if two fluorophores are imaged, A and B, there are four possibilities for each imaging pixel: 1) no fluorescence is detected, 2) fluorescence from A is detected, 3) fluorescence from B is detected, or 4) fluorescence from both A and B is detected. Each of these states four states may correspond to a different state of tissue. For example, no fluorescence may indicated normal tissue, only fluorescence from A may indicate a low grade tumor, fluorescence from both A and B may indicate medium grade tumor, and only fluorescence from B may indicate high grade tumor.

In an embodiment of the present disclosure, an imaging system for simultaneously visualizing each fluorophore of a plurality of fluorophores disposed in a spatial distribution.

In an embodiment of the present disclosure, a method of providing an imaging system for simultaneously visualizing each fluorophore of a plurality of fluorophores disposed in a spatial distribution.

In an embodiment of the present disclosure, a method of simultaneously visualizing each fluorophore of a plurality of fluorophores disposed in a spatial distribution, by way of an imaging system.

BRIEF DESCRIPTION OF THE DRAWING

The above, and other, aspects, features, and advantages of several embodiments of the present disclosure will be more apparent from the following Detailed Description as presented in conjunction with the following several figures of the Drawing which show example embodiments and in which.

Figure 1:
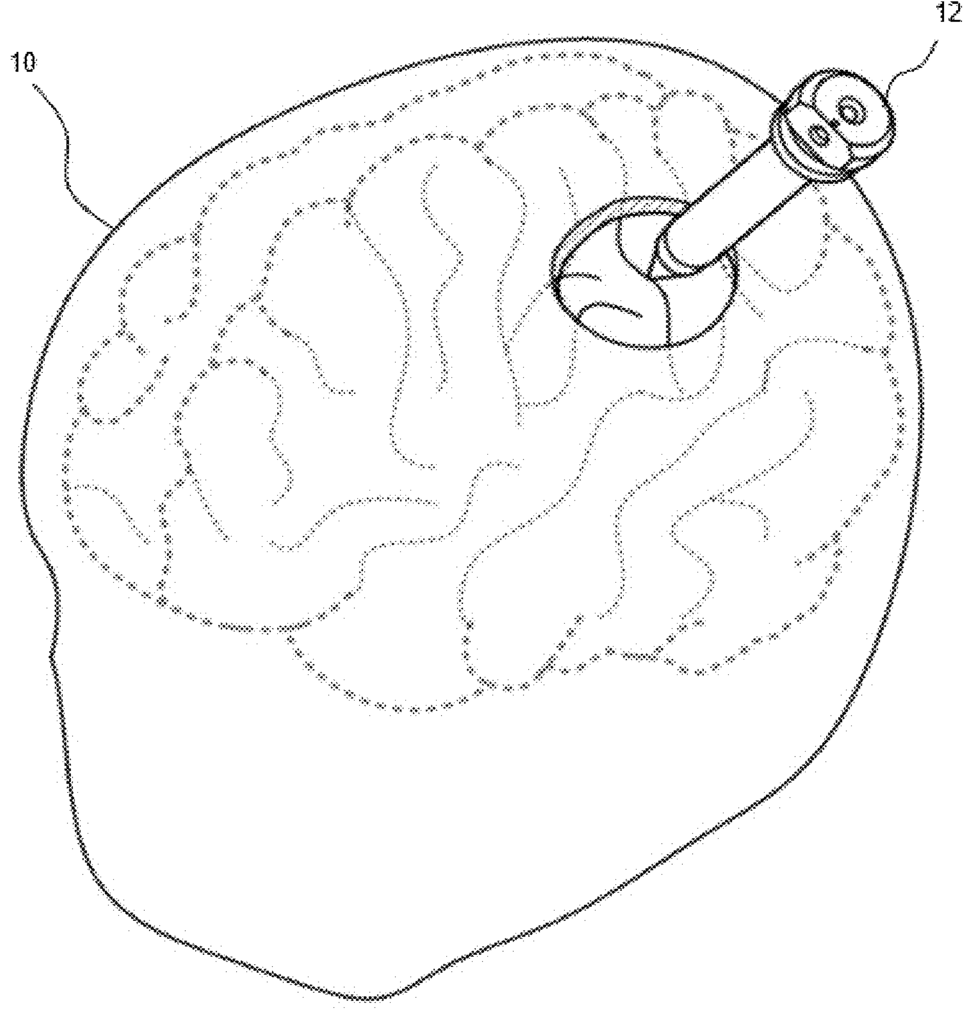
FIG. 1 is a diagram illustrating insertion of an access port into a human brain for providing access to internal brain tissue during an example medical procedure.

Corresponding reference numerals or characters indicate corresponding components throughout the several figures of the Drawing. Elements in the several figures of the Drawing are illustrated for simplicity and clarity and have not necessarily been drawn to scale. For example, the dimensions of some elements in the several figures may be emphasized relative to other elements for facilitating understanding of the various presently disclosed embodiments. Also, common, but well-understood, elements that are useful or necessary in commercially feasible embodiments are often not depicted to facilitate a less obstructed view of these various embodiments of the present disclosure.

DETAILED DESCRIPTION

Various embodiments and aspects of the present disclosure will be described with reference to below details. The following description and drawings are illustrative of the present disclosure and are not to be construed as limiting the disclosure. Numerous specific details are described to provide a thorough understanding of various embodiments of the present disclosure. However, in certain instances, well-known or conventional details are not described to provide a concise discussion of the embodiments of the present disclosure.

As used herein, the terms "comprises" and "comprising" are to be construed as being inclusive and open ended, and not exclusive. Specifically, when used in the specification and the claims, the terms "comprises," and "comprising," and variations thereof denote the specified features, steps, or components are included. These terms are not to be interpreted to exclude the presence of other features, steps, or components.

As used herein, the terms "sample," "example," or "exemplary" denote "serving as an example, instance, or illustration," and should not be construed as preferred or advantageous over other configurations disclosed herein.

As used herein, the terms "about" and "approximately" denote variations that may exist in the upper and lower limits of the value ranges, such as variations in properties, parameters, and dimensions. In one non-limiting example, the terms "about" and "approximately" denote plus or minus approximately 10 percent or less.

Unless defined otherwise, all technical and scientific terms used herein are intended to have the same meaning as commonly understood by one of ordinary skill in the art. Unless otherwise indicated, such as through context, as used herein, the following terms are intended to have the following meanings.

As used herein, the phrase "access port" refers to a cannula, conduit, sheath, port, tube, or other structure that is insertable into a subject, in order to provide access to internal tissue, organs, or other biological substances. In some embodiments, an access port may directly expose internal tissue, for example, via an opening or aperture at a distal end thereof, and/or via an opening or aperture at an intermediate location along a length thereof. In other embodiments, an access port may provide indirect access, via one or more surfaces that are transparent, or partially transparent, to one or more forms of energy or radiation, such as, but not limited to, electromagnetic waves and acoustic waves.

As used herein the phrase "intraoperative" refers to an action, process, method, event, or step that occurs or is carried out during at least a portion of a medical procedure. Intraoperative, as defined herein, is not limited to surgical procedures, and may refer to other types of medical procedures, such as diagnostic and therapeutic procedures.

Some embodiments of the present disclosure relate to minimally invasive medical procedures that are performed via an access port, whereby surgery, diagnostic imaging, therapy, or other medical procedures, e.g., minimally invasive medical procedures, are performed based on access to internal tissue through the access port.

In the example of a port-based surgery, a surgeon or robotic surgical system may perform a surgical procedure involving tumor resection in which the residual tumor remaining after is minimized, while also minimizing the trauma to the intact white and gray matter of the brain. In such procedures, trauma may occur, for example, due to contact with the access port, stress to the brain matter, unintentional impact with surgical devices, and/or accidental resection of healthy tissue. A key to minimizing trauma is ensuring that the surgeon performing the procedure has the best possible view of the surgical site of interest without having to spend excessive amounts of time and concentration repositioning tools, scopes and/or cameras during the medical procedure.

In various examples, the present disclosure describes an example imaging system that may help to address some of the challenges discussed above. For example, the disclosed imaging system may enable a user, e.g., a surgeon, to obtain three-dimensional (3D) views, high magnification narrow field views, and wide field views without having to switch between separate imaging systems. Further, the disclosed imaging system may provide dual fields-of-view (FOVs), in which narrow field and wide field views are simultaneously viewable. Using examples of the imaging system described herein, a surgeon may change between different viewing modes mid-surgery, for example switching to a 3D view when needed for depth perception, e.g., to perform complex vascular work, and switching to dual FOVs for situations where high magnification and situational context is desired, e.g., for suturing.

The systems and methods described herein may be useful in the field of neurosurgery, including oncological care, neurodegenerative disease, stroke, brain trauma and orthopedic surgery. The teachings of the present disclosure may be applicable to other conditions or fields of medicine. While the present disclosure describes examples in the context of neurosurgery, the present disclosure may be applicable to other surgical procedures that may use intraoperative optical imaging.

Various example apparatuses or processes will be described below. No example embodiment described below limits any claimed embodiment and any claimed embodiments may cover processes or apparatuses that differ from those examples described below. The claimed embodiments are not limited to apparatuses or processes having all of the features of any one apparatus or process described below or to features common to multiple or all of the apparatuses or processes described below. Possible is that an apparatus or process described below is not part of any claimed embodiment.

Referring to FIG. 1, this diagram illustrates the insertion of an access port into a human brain, for providing access to internal brain tissue during a medical procedure, in accordance with an embodiment of the present disclosure. An access port 12 is inserted into a human brain 10, thereby providing access to internal brain tissue. The access port 12 comprises such instruments as catheters, surgical probes, or cylindrical ports such as the NICO BrainPath™. Surgical tools and instruments may then be inserted within the lumen of the access port 12 in order to perform surgical, diagnostic or therapeutic procedures, such as resecting tumors as necessary. In the example of a port-based surgery, a straight or linear access port 12 is typically guided down a sulci path of the brain. Surgical instruments would then be inserted down the access port 12.

Still referring to FIG. 1, the embodiments of the present disclosure apply equally well to catheters, deep brain stimulation (DBS) needles, a biopsy procedure, and also to biopsies and/or catheters in other medical procedures performed on other parts of the body, as well as to medical procedures that do not use an access port. Various examples of the present disclosure may be generally suitable for use in any medical procedure that may use optical imaging systems.

Figure 2A:
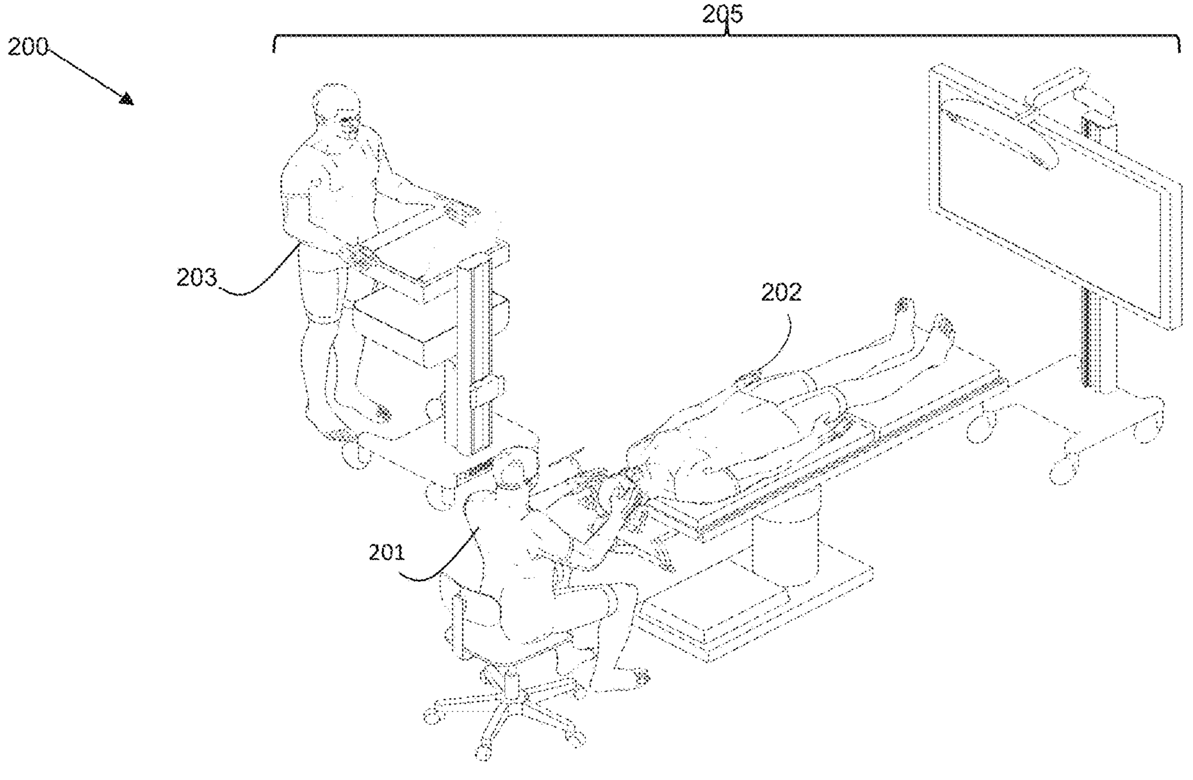
FIG. 2A is a diagram illustrating an example navigation system to support image guided surgery.

Referring to FIG. 2A, an exemplary navigation system environment 200 is used to support navigated image-guided surgery, in accordance with an embodiment of the present disclosure. A surgeon 201 conducts a surgery on a patient 202 in an operating room (OR) environment. A medical navigation system 205 comprises an equipment tower, tracking system, displays, and tracked instruments to assist the surgeon 201 during his procedure. An operator 203 may also be present to operate, control, and assist the medical navigation system 205.

Figure 2B:
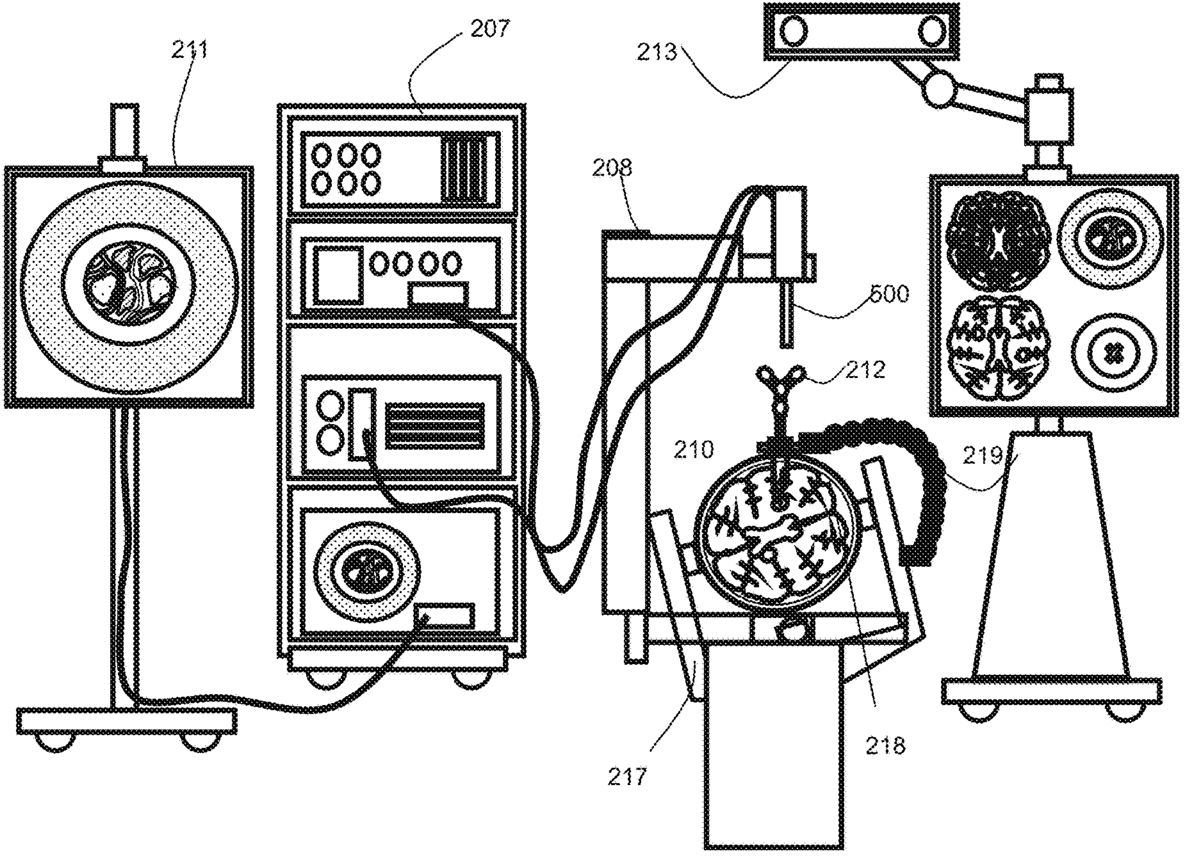
FIG. 2B is a diagram illustrating system components of an example navigation system.

Referring to FIG. 2B, this diagram illustrates an example medical navigation system 205 in greater detail, in accordance with an embodiment of the present disclosure. The disclosed optical imaging system may be used in the context of the medical navigation system 205. The medical navigation system 205 comprises one or more displays 206, 211 for displaying a video image, an equipment tower 207, and a positioning system 208, such as a mechanical arm, which may support an optical imaging system 500 (which comprises an optical scope). One or more of the displays 206, 211 comprises a touch-sensitive display for receiving touch input. The equipment tower 207 is mounted on a frame, e.g., a rack or cart, and accommodates a power supply and a computer or a controller configured to execute planning software, navigation software and/or other software to manage the positioning system 208 one or more instruments tracked by the navigation system 205. In some examples, the equipment tower 207 may be a single tower configuration operating with dual displays 206, 211; however, other configurations may also exist, e.g., a dual tower, a single display, etc. Furthermore, the equipment tower 207 is configured with a universal power supply (UPS) to provide emergency power in addition to a regular AC adapter power supply.

Still referring to FIG. 2B, a portion of the patient's anatomy may be held in place by a holder. For example, the patient's head and brain are held in place by a head holder 217. An access port 12 and associated introducer 210 are inserted into the head, to provide access to a surgical site in the head. The imaging system 500 is used to view down the access port 12 at a sufficient magnification to allow for enhanced visibility down the access port 12. The output of the imaging system 500 may be received by one or more computers or controllers to generate a view that may be depicted on a visual display, e.g., one or more displays 206, 211.

Still referring to FIG. 2B, in some examples, the navigation system 205 comprises a tracked pointer 222. The tracked pointer 222, comprising markers 212 to enable tracking by a tracking camera 213, is used to identify points, e.g., fiducial points, on a patient. An operator, typically a nurse or the surgeon 201, uses the tracked pointer 222 to identify the location of points on the patient 202, in order to register the location of selected points on the patient 202 in the navigation system 205. A guided robotic system with closed loop control may be used as a proxy for human interaction. Guidance to the robotic system may be provided by any combination of input sources such as image analysis, tracking of objects in the operating room using markers placed on various objects of interest, or any other suitable robotic system guidance techniques.

Still referring to FIG. 2B, the fiducial markers 212 are coupled with the introducer 210 for tracking by the tracking camera 213, thereby providing positional information of the introducer 210 from the navigation system 205. In some examples, the fiducial markers 212 is alternatively, or additionally, coupled with the access port 12. In some examples, the tracking camera 213 comprises a 3D infrared optical tracking stereo camera, e.g., a 3D infrared optical tracking stereo camera made by Northern Digital Imaging® (NDI). In some examples, the tracking camera 213 comprises an electromagnetic system (not shown), such as a field transmitter that may use one or more receiver coils located on the tool(s) to be tracked. A known profile of the electromagnetic field and known position of receiver coil(s) relative to each other are used to infer the location of the tracked tool(s) using the induced signals and their phases in each of the receiver coils. Operation and examples of this technology is further explained in Chapter 2 of "Image-Guided Interventions Technology and Application," Peters, T.; Cleary, K., 2008, ISBN: 978-0-387-72856-7, incorporated herein by reference. Location data of the positioning system 208 and/or access port 12 is determined by the tracking camera 213 by detection of the fiducial markers 212 coupled with, such as placed on or otherwise in fixed relation, e.g., in rigid connection, any of the positioning system 208, the access port 12, the introducer 210, the tracked pointer 222, and/or other tracked instruments. The fiducial marker(s) 212 may be active or passive markers. A display 206, 211 may provide an output of the computed data of the navigation system 205. In some examples, the output provided by the display 206, 211 comprises axial, sagittal, and coronal, views of patient anatomy as part of a multi-view output.

Still referring to FIG. 2B, the active or passive fiducial markers 212 are coupled with, such as placed on tools, e.g., the access port 12 and/or the imaging system 500, to be tracked, to determine the location and orientation of these tools using the tracking camera 213 and navigation system 205. The markers 212 are captured by a stereo camera of the tracking system to give identifiable points for tracking the tools. A tracked tool may be defined by a grouping of markers 212, which may define a rigid body to the tracking system. This may in turn be used to determine the position and/or orientation in 3D of a tracked tool in a virtual space. The position and orientation of the tracked tool in 3D may be tracked in six degrees of freedom, e.g., x, y, z coordinates and pitch, yaw, roll rotations, in five degrees of freedom, e.g., x, y, z, coordinate and two degrees of free rotation, but preferably tracked in at least three degrees of freedom, e.g., tracking the position of the tip of a tool in at least x, y, z coordinates. In typical use with navigation systems, at least three markers 212 are provided on a tracked tool to define the tool in virtual space; however, four or more markers 212 can be used.

Still referring to FIG. 2B, camera images capturing the markers 212 are logged and tracked, by, for example, a closed-circuit television (CCTV) camera. The markers 212 may be selected to enable or assist in segmentation in the captured images. For example, infrared (IR)-reflecting markers and an IR light source from the direction of the camera may be used. An example of such an apparatus may be tracking devices such as the Polaris®. system available from Northern Digital Inc. In some examples, the spatial position and orientation of the tracked tool and/or the actual and desired position and orientation of the positioning system 208 may be determined by optical detection using a camera. The optical detection may be done using an optical camera, rendering the markers 212 optically visible.

Still referring to FIG. 2B, in some examples, the markers 212, e.g., reflectospheres, are used in combination with a suitable tracking system, to determine the spatial positioning position of the tracked tools within the operating theatre. Different tools and/or targets may be provided with respect to sets of markers 212 in different configurations. Differentiation of the different tools and/or targets and their corresponding virtual volumes may be possible based on the specification configuration and/or orientation of the different sets of markers 212 relative to one another, enabling each such tool and/or target to have a distinct individual identity within the navigation system 205. The individual identifiers may provide information to the navigation system 205, such as information relating to the size and/or shape of the tool within the navigation system 205. The identifier may also provide additional information such as the tool's central point or the tool's central axis, among other information. The virtual tool may also be determinable from a database of tools stored in or provided to the navigation system 205. The markers 212 may be tracked relative to a reference point or reference object in the operating room, such as the patient 202.

Still referring to FIG. 2B, various types of markers may be used. The markers 212 may all be the same type or comprise a combination of two or more different types. Possible types of markers that could be used comprises reflective markers, radiofrequency (RF) markers, electromagnetic (EM) markers, pulsed or unpulsed light-emitting diode (LED) markers, glass markers, reflective adhesives, or reflective unique structures or patterns, among others. RF and EM markers may have specific signatures for the specific tools they may be coupled with. Reflective adhesives, structures and patterns, glass markers, and LED markers may be detectable using optical detectors, while RF and EM markers may be detectable using antennas. Different marker types may be selected to suit different operating conditions. For example, using EM and RF markers may enable tracking of tools without requiring a line-of-sight from a tracking camera to the markers 212, and using an optical tracking system may avoid additional noise from electrical emission and detection systems.

Still referring to FIG. 2B, in some examples, the markers 212 comprises printed or 3D designs that may be used for detection by an auxiliary camera, such as a wide-field camera (not shown) and/or the imaging system 500. Printed markers may also be used as a calibration pattern, for example to provide distance information, e.g., 3D distance information, to an optical detector. Printed identification markers comprise designs such as concentric circles with different ring spacing and/or different types of bar codes, among other designs. In some examples, in addition to or in place of using markers 212, the contours of known objects, e.g., the side of the access port 206, could be captured by and identified using optical imaging devices and the tracking system.

Still referring to FIG. 2B, a guide clamp 218 (or more generally a guide) for holding the access port 12 may be provided. The guide clamp 218 allows the access port 206 to be held at a fixed position and orientation while freeing up the surgeon's hands. An articulated arm 219 is provided to hold the guide clamp 218. The articulated arm 219 has up to six degrees of freedom to position the guide clamp 218. The articulated arm 219 is lockable to fix its position and orientation once a desired position is achieved. The articulated arm 219 is attached, or attachable, to a point based on the patient head holder 217, or another suitable point, e.g., on another patient support, such as on the surgical bed, to ensure that when locked in place, the guide clamp 218 does not move relative to the patient's head.

Still referring to FIG. 2B, in a surgical operating room (or theatre), setup of a navigation system may be relatively complicated; there may be many pieces of equipment associated with the surgical procedure, as well as elements of the navigation system 205. Further, setup time typically increases as more equipment is added. To assist in addressing this, the navigation system 205 comprises two additional wide-field cameras to enable video overlay information. Video overlay information can then be inserted into displayed images, such as images displayed on one or more of the displays 206, 211. The overlay information may illustrate the physical space where accuracy of the 3D tracking system (which is typically part of the navigation system) is greater, may illustrate the available range of motion of the positioning system 208 and/or the imaging system 500, and/or may help to guide head and/or patient positioning.

Still referring to FIG. 2B, the navigation system 205 may provide tools to the neurosurgeon that may help to provide more relevant information to the surgeon and may assist in improving performance and accuracy of port-based neurosurgical operations. Although described in the context of port-based neurosurgery, e.g., for removal of brain tumors and/or for treatment of intracranial hemorrhages (ICH), the navigation system 205 is also suitable for one or more of: brain biopsy, functional/deep-brain stimulation, catheter/ shunt placement (in the brain or elsewhere), open craniotomies, and/or endonasal/skull-based/ear-nose-throat (ENT) procedures, among others. The same navigation system 205 may be used for carrying out any or all of these procedures, with or without modification as appropriate.

Still referring to FIG. 2B, for example, although the present disclosure discusses the navigation system 205 in the context of neurosurgery, the navigation system 205 may be used to carry out a diagnostic procedure, such as brain biopsy. A brain biopsy may involve the insertion of a thin needle into a patient's brain for the purpose of removing a sample of brain tissue. The brain tissue may be subsequently assessed by a pathologist to determine if it is cancerous, for example. Brain biopsy procedures may be conducted with or without a stereotactic frame. Both types of procedures may be performed using image-guidance. Frameless biopsies, in particular, may be conducted using the navigation system 205.

Still referring to FIG. 2B, in some examples, the tracking camera 213 may be part of any suitable tracking system. In some examples, the tracking camera 213 (and any associated tracking system that uses the tracking camera 213) may be replaced with any suitable tracking system which may or may not use camera-based tracking techniques. For example, a tracking system that does not use the tracking camera 213, such as a radiofrequency tracking system, may be used with the navigation system 205.

Figure 3:
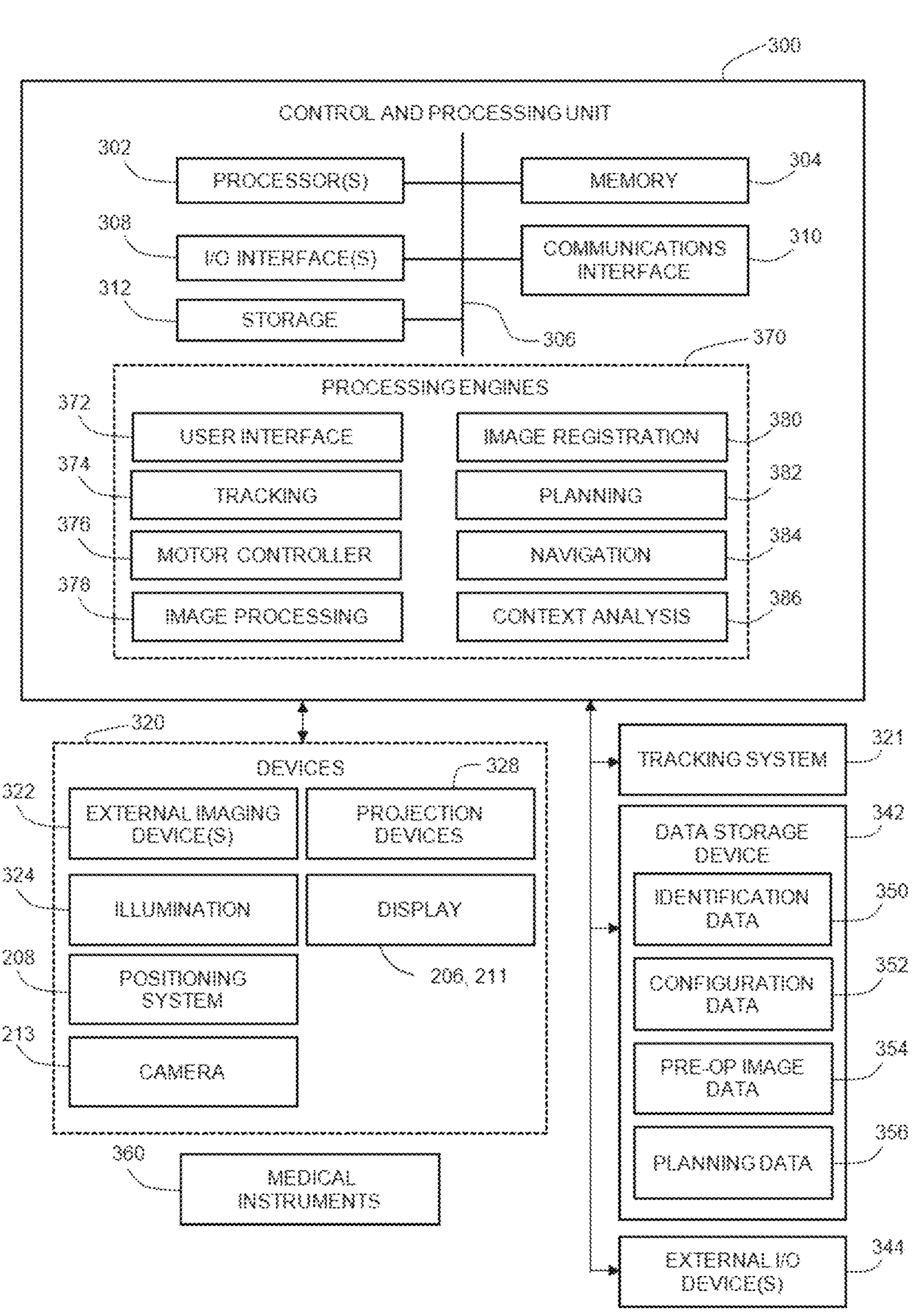
FIG. 3 is a block diagram illustrating an example control and processing system that usable in the example navigation systems, as shown in FIGS. 2A and 2B.

Referring to FIG. 3, this block diagram illustrates a control and processing system 300 that is used in the medical navigation system 205, as shown in FIG. 2B, e.g., as part of the equipment tower 207, in accordance with an embodiment of the present disclosure. In one example, control and processing system 300 comprises one or more processors 302, a memory 304, a system bus 306, one or more input/output interfaces 308, a communications interface 310, and storage device 312. The control and processing system 300 is interfaceable with other external devices, such as a tracking system 321, data storage 342, and external user input and output devices 344, which comprise, for example, one or more of a display, keyboard, mouse, sensors coupled with medical equipment, a foot pedal, a microphone, and a speaker. Data storage 342 comprises any suitable data storage device, such as a local or remote computing device, e.g., a computer, a hard drive, a digital media device, or a server, having a database stored thereon. In the example, data storage device 342 comprises identification data 350 for identifying one or more medical instruments 360 and configuration data 352 that associates customized configuration parameters with one or more medical instruments 360. The data storage device 342 further comprises preoperative image data 354 and/or medical procedure planning data 356. Although the data storage device 342 is shown as a single device, in other embodiments, the data storage device 342 comprises multiple storage devices.

Still referring to FIG. 3, the medical instruments 360 are identifiable by the control and processing unit 300. The medical instruments 360 are coupled with, and controlled by, the control and processing unit 300, or the medical instruments 360 are operated, or otherwise employed, independent of the control and processing unit 300. The tracking system 321 may be employed to track one or more medical instruments 360 and spatially register the one or more tracked medical instruments to an intraoperative reference frame. For example, the medical instruments 360 comprises tracking markers, such as tracking spheres that may be recognizable by the tracking camera 213. In one example, the tracking camera 213 may be an infrared (IR) tracking camera. In another example, as sheath placed over a medical instrument 360 may be coupled with and controlled by the control and processing unit 300.

Still referring to FIG. 3, the control and processing unit 300 interfaces with a number of configurable devices and may intraoperatively reconfigure one or more of such devices based on configuration parameters obtained from configuration data 352. Examples of devices 320 include one or more external imaging devices 322, one or more illumination devices 324, the positioning system 208, the tracking camera 213, one or more projection devices 328, and one or more displays 206, 211.

Still referring to FIG. 3, exemplary aspects of the disclosure can be implemented via the processor(s) 302 and/or memory 304. For example, the functionalities described herein can be partially implemented via hardware logic in the processor 302 and partially using the instructions stored in the memory 304, as one or more processing modules or engines 370. Example processing modules include, but are not limited to, a user interface engine 372, a tracking module 374, a motor controller 376, an image processing engine 378, an image registration engine 380, a procedure planning engine 382, a navigation engine 384, and a context analysis module 386. While the example processing modules are shown separately, in some examples, the processing modules 370 are stored in the memory 304; and the processing modules 370 are collectively referred to as processing modules 370. In some examples, two or more modules 370 are used together to perform a function. Although depicted as separate modules 370, the modules 370 are embodied as a unified set of computer-readable instructions, e.g., stored in the memory 304, rather than distinct sets of instructions.

Still referring to FIG. 3, the system is not intended to be limited to the components as shown. One or more components of the control and processing system 300 may be provided as an external component or device. In one example, the navigation module 384 is provided as an external navigation system that is integrated with the control and processing system 300. Some embodiments may be implemented using the processor 302 without additional instructions stored in memory 304. Some embodiments may be implemented using the instructions stored in memory 304 for execution by one or more general purpose microprocessors. Thus, the disclosure is not limited to a specific configuration of hardware and/or software.

Still referring to FIG. 3, in some examples, the navigation system 205, which comprises the control and processing unit 300, may provide tools to the surgeon that may help to improve the performance of the medical procedure and/or post-operative outcomes. In addition to removal of brain tumours and intracranial hemorrhages (ICH), the navigation system 205 can also be applied to a brain biopsy, a functional/deep-brain stimulation, a catheter/shunt placement procedure, open craniotomies, endonasal/skull-based/ENT, spine procedures, and other parts of the body such as breast biopsies, liver biopsies, etc. While several examples have been provided, examples of the present disclosure may be applied to any suitable medical procedure.

Figure 4A:
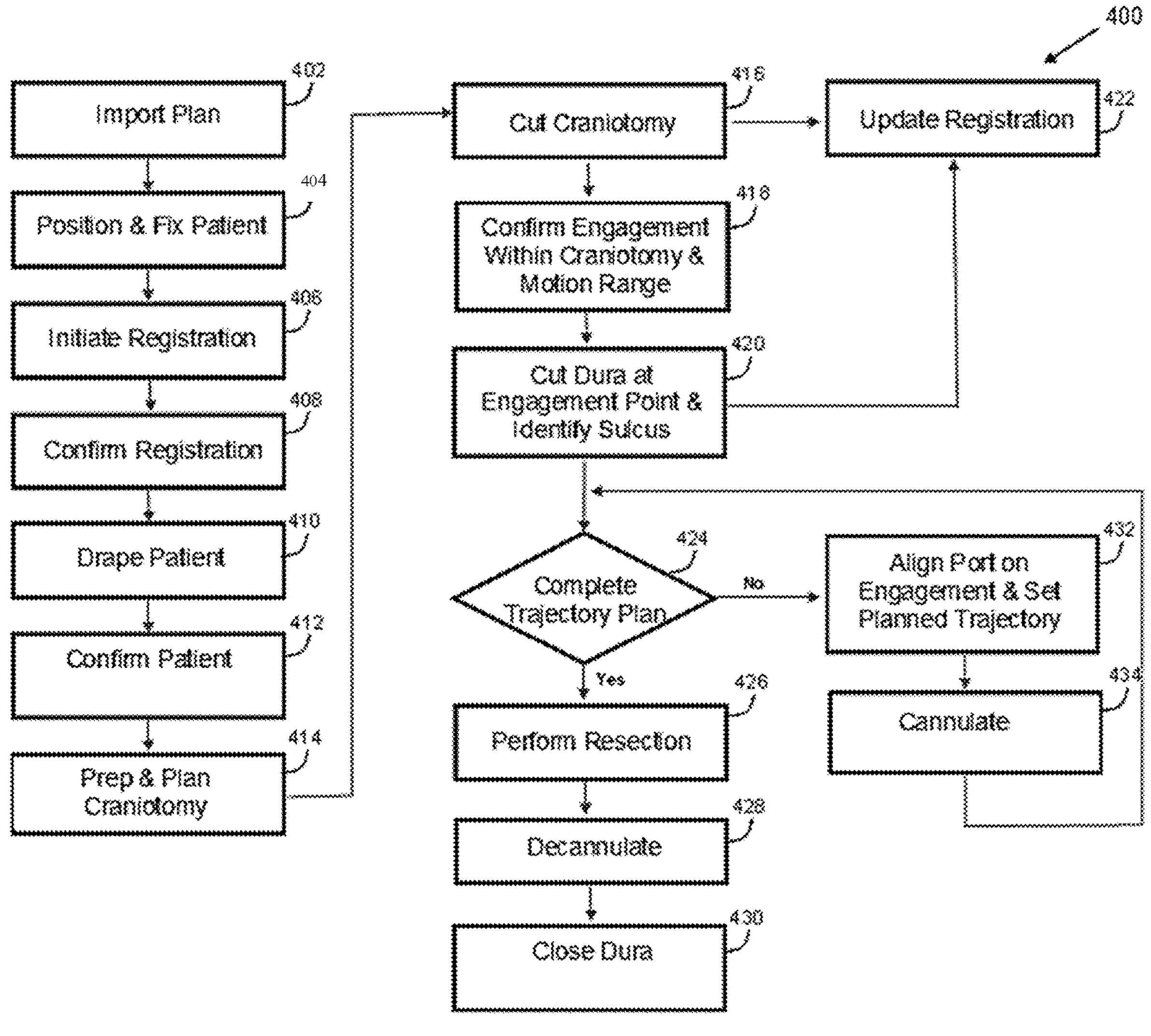
FIG. 4A is a flow diagram illustrating an example method, involved in a surgical procedure, which is implementable by using the example navigation systems, as shown in FIGS. 2A and 2B.

Referring to FIG. 4A, this flow diagram illustrates an example method 400 of performing a port-based surgical procedure using a navigation system, such as the medical navigation system 205, as shown in FIGS. 2A and 2B, in accordance with an embodiment of the present disclosure. At a first block 402, the port-based surgical plan is imported. Once the plan has been imported into the navigation system at the block 402, the patient is affixed into position using a body holding mechanism. The head position is also confirmed with the patient plan in the navigation system (block 404), which in one example may be implemented by the computer or controller forming part of the equipment tower 207. Next, registration of the patient is initiated (block 406). The phrase "registration" or "image registration" refers to the process of transforming different sets of data into one coordinate system. Data comprises multiple photographs, data from different sensors, times, depths, or viewpoints. The process of "registration" is used in the present disclosure for medical imaging in which images from different imaging modalities are co-registered. Registration is used in order to be able to compare or integrate the data obtained from these different modalities.

Still referring to FIG. 4A, numerous registration techniques available; and one or more of the techniques may be applied to the embodiments of the present disclosure and are encompassed by the present disclosure. Non-limiting examples include intensity-based methods that compare intensity patterns in images via correlation metrics, while feature-based methods find correspondence between image features such as points, lines, and contours. Image registration methods may also be classified according to the transformation models they use to relate the target image space to the reference image space. Another classification can be made between single-modality and multi-modality methods. Single-modality methods typically register images in the same modality acquired by the same scanner or sensor type, for example, a series of magnetic resonance (MR) images may be co-registered, while multi-modality registration methods are used to register images acquired by different scanner or sensor types, for example, in magnetic resonance imaging (MRI) and positron emission tomography (PET). In the present disclosure, multi-modality registration methods are used in medical imaging of the head and/or brain as images of a subject are frequently obtained from different scanners. Examples include registration of brain computerized tomography (CT)/MRI images or PET/CT images for tumor localization, registration of contrast-enhanced CT images against non-contrast-enhanced CT images, and registration of ultrasound and CT.

Figure 4B:
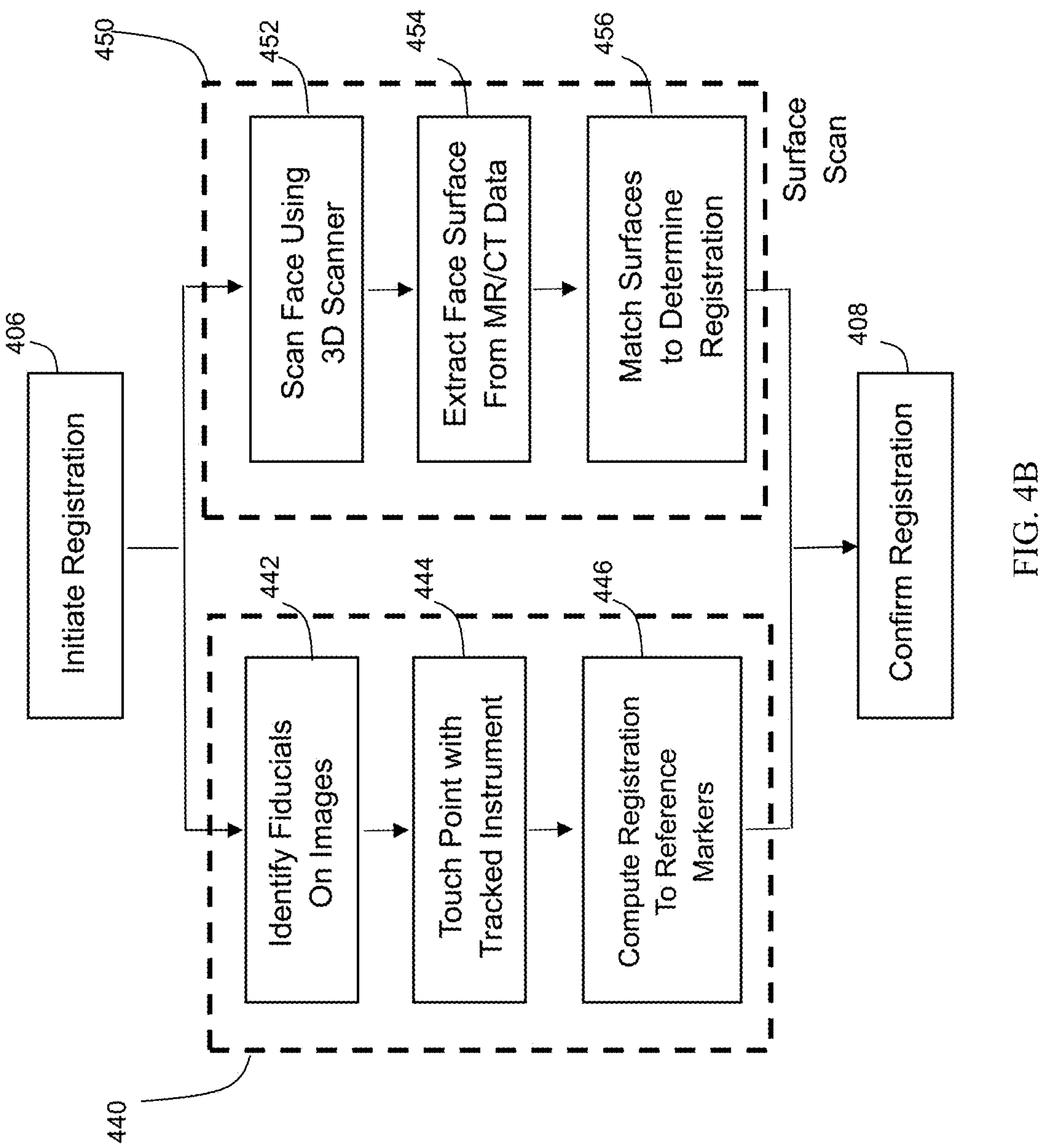
FIG. 4B is a flow diagram illustrating an example method of registering a patient for a surgical procedure, as shown in FIG. 4A.

Referring to FIG. 4B, this flow diagram illustrates an example method involved in registration block 406, as shown in FIG. 4A, in greater detail, in accordance with an embodiment of the present disclosure. If the use of fiducial touch points 440 is contemplated, the method involves first identifying fiducial markers on images (block 442), then touching the touch points with a tracked instrument (block 444). Next, the navigation system computes the registration to reference markers (block 446). Alternately, registration can also be completed by conducting a surface scan procedure (block 450). The block 450 is presented to show an alternative approach but may not typically be used when using a fiducial pointer. First, the face is scanned using a 3D scanner (block 452). Next, the face surface is extracted from MR/CT data (block 454). Finally, surfaces are matched to determine registration data points (block 456). Upon completion of either the fiducial touch points procedure 440 or surface scan 450 procedure, the data extracted is computed and used to confirm registration at block 408, as shown in FIG. 4A.

Referring back to FIG. 4A, once registration is confirmed (block 408), the patient is draped (block 410). Typically, draping involves covering the patient and surrounding areas with a sterile barrier to create and maintain a sterile field during the surgical procedure. The purpose of draping is to eliminate the passage of microorganisms, e.g., bacteria, between non-sterile and sterile areas. At this point, conventional navigation systems require that the non-sterile patient reference is replaced with a sterile patient reference of identical geometry location and orientation. Upon completion of draping (block 410), the patient engagement points are confirmed (block 412) and then the craniotomy is prepared and planned (block 414). Upon completion of the preparation and planning of the craniotomy (block 414), the craniotomy is cut, and a bone flap is temporarily removed from the skull to access the brain (block 416). Registration data is updated with the navigation system at this point (block 422). Next, the engagement within craniotomy and the motion range are confirmed (block 418). Next, the procedure advances to cutting the dura at the engagement points and identifying the sulcus (block 420).

Still referring back to FIG. 4A, thereafter, the cannulation process is initiated (block 424). Cannulation involves inserting a port into the brain, typically along a sulci path as identified at 420, along a trajectory plan. Cannulation is typically an iterative process that involves repeating the steps of aligning the port on engagement and setting the planned trajectory (block 432) and then cannulating to the target depth (block 434) until the complete trajectory plan is executed (block 424). Once cannulation is complete, the surgeon then performs resection (block 426) to remove part of the brain and/or tumor of interest. The surgeon then decannulates (block 428) by removing the port and any tracking instruments from the brain. Finally, the surgeon closes the dura and completes the craniotomy (block 430). Some aspects of FIG. 4A are specific to port-based surgery, such as portions of blocks 428, 420, and 434, but the appropriate portions of these blocks may be skipped or suitably modified when performing non-port-based surgery.

Referring back to FIGS. 4A and 4B, when performing a surgical procedure using a medical navigation system 205, the medical navigation system 205 may acquire and maintain a reference of the location of the tools in use as well as the patient in a 3D space. In other words, during a navigated neurosurgery, there may be a tracked reference frame that is fixed, e.g., relative to the patient's skull). During the registration phase of a navigated neurosurgery, e.g., the step indicated by block 406, as shown in FIGS. 4A and 4B, a transformation is calculated that maps the frame of reference of preoperative MRI or CT imagery to the physical space of the surgery, specifically the patient's head. This may be accomplished by the navigation system 205 tracking locations of fiducial markers fixed to the patient's head, relative to the static patient reference frame. The patient reference frame is typically rigidly coupled with the head fixation device, such as a Mayfield® clamp Registration is typically performed before the sterile field has been established, e.g., the step indicated by 410, as shown in FIG. 4A.

Figure 5:
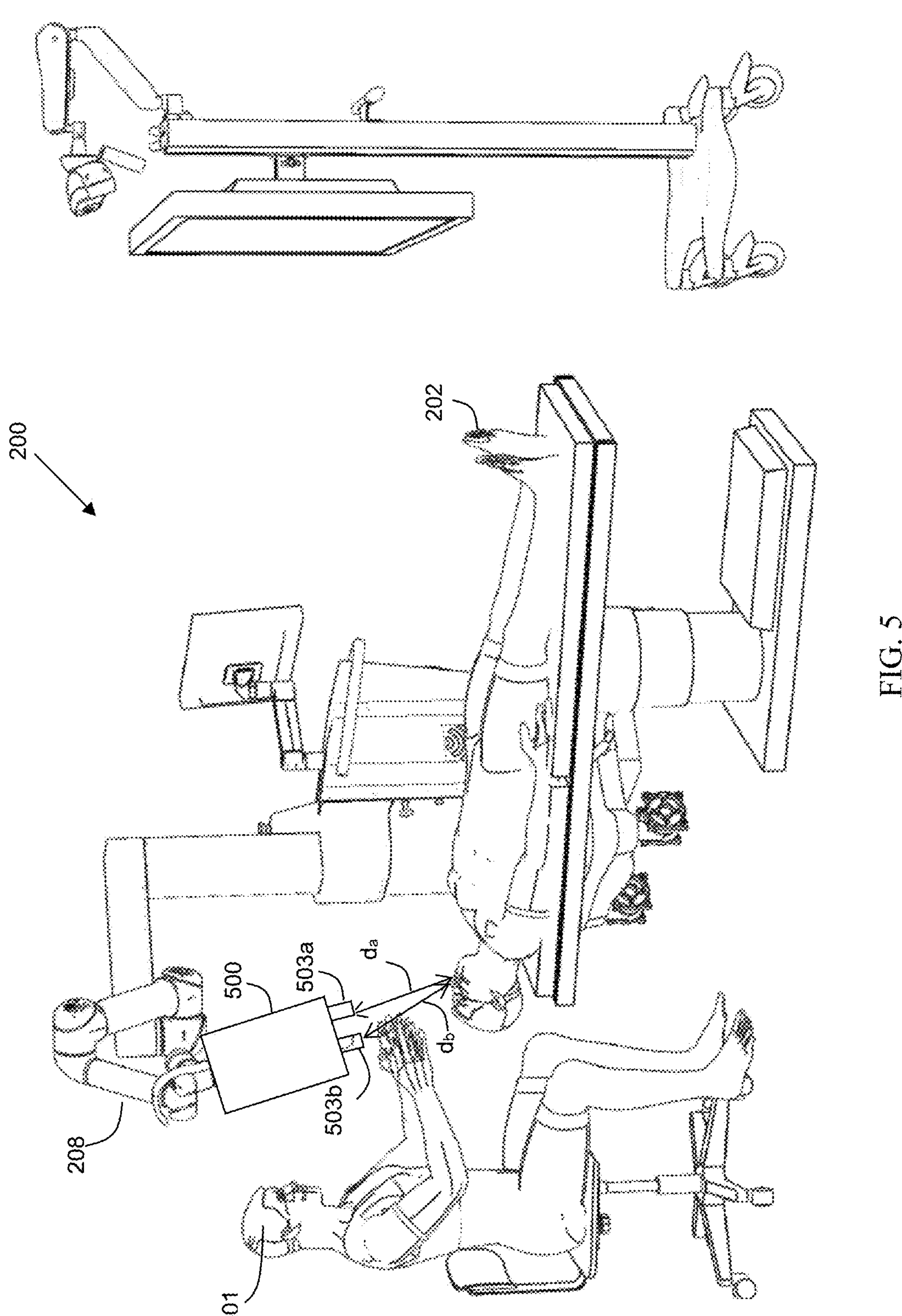
FIG. 5 is a diagram illustrating use of an example optical imaging system during a medical procedure.

Referring to FIG. 5, this diagram illustrates use of an example imaging system 500, described further below, in a medical procedure, in accordance with an embodiment of the present disclosure. Although the imaging system 500 is shown as being used in the context of a navigation system environment 200, e.g., using a navigation system as described above, the imaging system 500 may also be used outside of a navigation system environment, e.g., without any navigation support. An operator, typically a surgeon 201, may use the imaging system 500 to observe the surgical site, e.g., to look down an access port. The imaging system 500 may be coupled with a positioning system 208, e.g., a controllable and adjustable robotic arm. The position and orientation of the positioning system 208, imaging system 500 and/or access port may be tracked using a tracking system, such as described for the navigation system 205.

Still referring to FIG. 5, the imaging system 500 comprises two apertures 503*a*, 503*b*, one for each optical assembly. The apertures 503*a*, 503*b* of each optical assembly may be independently adjustable, which may enable each optical assembly to have independently controllable resolution and depth-of-field. The distances $d_a$, $d_b$ between each aperture 503*a*, 503*b* of the imaging system 500 and the viewing target, e.g., the surface of the surgical site, may be referred to as the respective working distance of each optical assembly. The imaging system 500 may be designed to be used in a predefined range of working distance, e.g., in the range of about 20 cm to about 65 cm. If the imaging system 500 is mounted on the positioning system 208, the actual available range of working distance may be dependent on both the working distance of the imaging system 500 as well as the workspace and kinematics of the positioning system 208.

Figure 6:
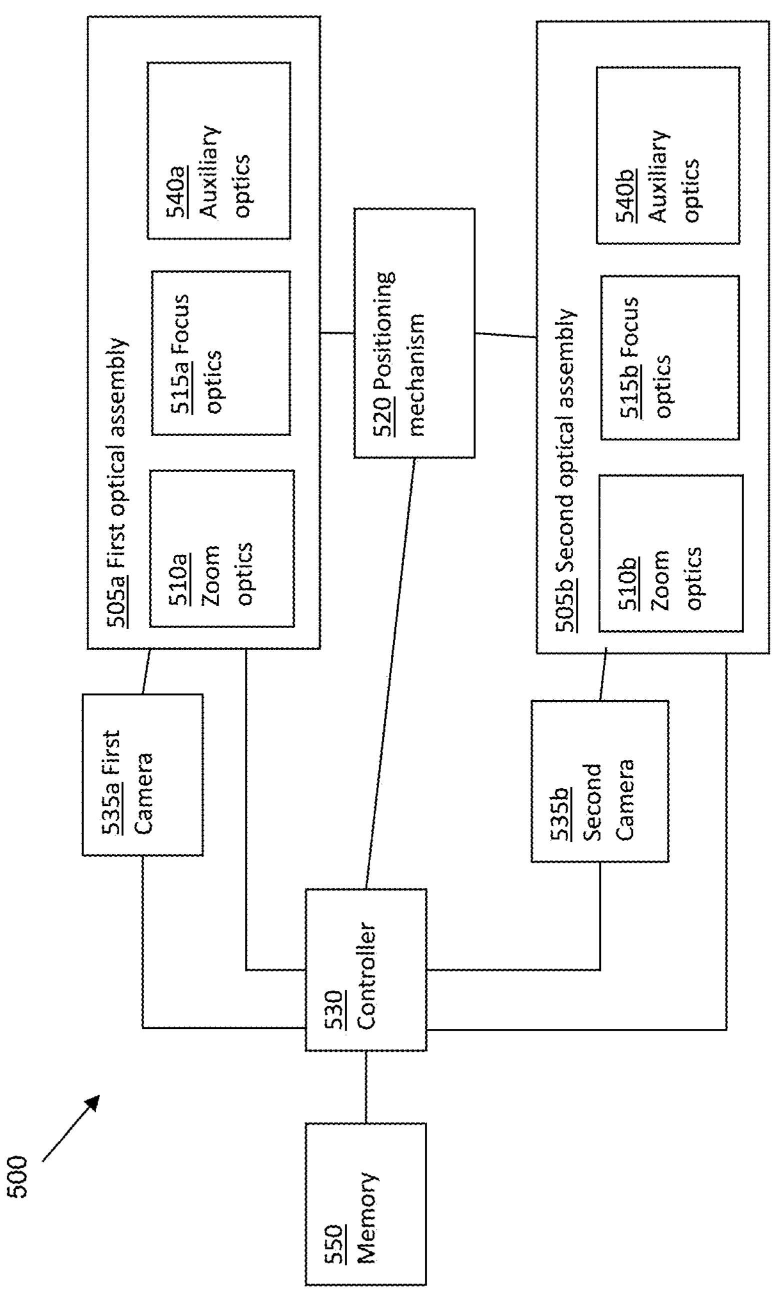
FIG. 6 is a block diagram illustrating components of an example optical imaging system.

Referring to FIG. 6, this block diagram illustrates components of an example imaging system 500, as shown in FIG. 5, in accordance with an embodiment of the present disclosure. The imaging system 500 comprises first and second optical assemblies 505*a*, 505*b* (also referred to as optical trains), each of which may be operated independently or cooperatively. Each optical assembly 505*a*, 505*b* may capture an image received through respective apertures 503*a*, 503*b* (FIG. 6). For simplicity, the first optical assembly 505*a* will be described in detail; the second optical assembly 505*b* may have the same components and function as the first optical assembly 505*a*, for example as described below.

Still referring to FIG. 6, the first optical assembly 505*a* comprises optics, e.g., lenses, optical fibers, etc., for focusing and zooming on the viewing target. The first optical assembly 505*a* comprises zoom optics 510*a* (which comprises one or more zoom lenses) and focus optics 515*a* (which comprises one or more focus lenses). Each of the zoom optics 510*a* and focus optics 515*a* are independently movable within the optical assembly, in order to adjust the zoom and focus, respectively. Where the zoom optics 510*a* and/or the focus optics 515*a* include more than one lens, each individual lens may be independently movable. The aperture 503*a* of the first optical assembly 505*a* may be adjustable.

Still referring to FIG. 6, the first optical assembly 505*a* may also include one or more auxiliary optics 540*a*, e.g., rotational optics and/or aperture adjustment, which may be static or dynamic. For example, the auxiliary optics 540*a* comprises rotational optics, e.g., prisms, to enable the user to define the orientation of the captured image. The rotational optics of each optical assembly 505*a*, 505*b* may be independently adjustable, which may enable each optical assembly 505*a*, 505*b* to capture independently rotation images.

Still referring to FIG. 6, alternatively, instead of using rotation optics, software image processing may be performed to rotate a captured image to the desired orientation. Each optical assembly 505*a*, 505*b* may also include one or more filters, which may each be independently configurable, e.g., for different wavelengths, polarizations, neutral densities, or other characteristics. The filters may be placed in the optical path, e.g., using filter wheels or other similar mechanism). Each optical assembly 505*a*, 505*b* may have different filters.

Still referring to FIG. 6, the imaging system 500 comprises one or more positioning mechanisms 520, e.g., gear train, rack and gear system, conveyor mechanism or linear stage mechanism) for positioning the first and second optical assemblies 505*a*, 505*b* relative to each other. For simplicity, the present disclosure may refer to the positioning mechanism 520 in the singular, however the present disclosure also includes embodiments where the positioning mechanism 520 comprises a plurality of such mechanisms.

Still referring to FIG. 6, in some examples, the imaging system 500 comprises a light source or may direct light from an external light source, for illuminating the viewing target. The light source (whether internal or external to the imaging system 500) may be capable of providing different wavelengths of light and different bandwidths, for example including broadband illumination for white light imaging, or narrow band illumination in the fluorescence spectrum for fluorescence imaging. Fluorescence imaging typically involves the use of appropriate excitation and emission filters. The wavelength characteristics of the filter are typically specific to the fluorophore used.

Figure 7:
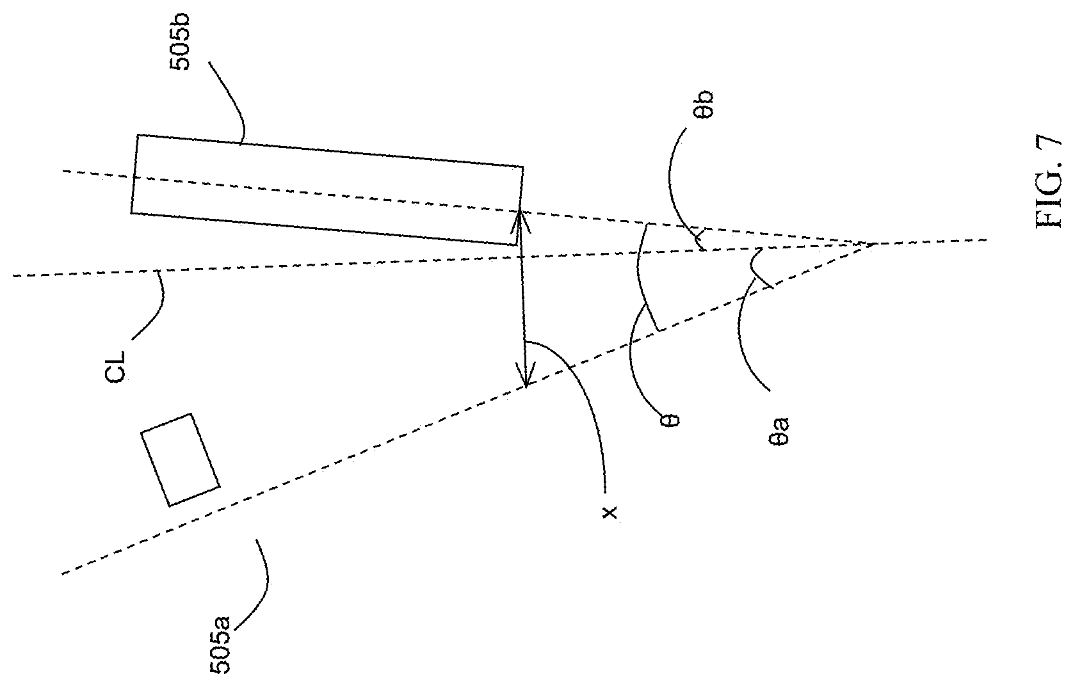
FIG. 7 is a diagram illustrating a relative position and a relative orientation of two optical assemblies of an example optical imaging system.

Still referring to FIG. 6, throughout the present disclosure, the positions, and orientations of the optical assemblies 505*a*, 505*b* may be described with reference to the optical axes of each optical assembly 505*a*, 505*b*. Generally, the optical axis of an optical assembly 505*a*, 505*b* may be defined as the axis along which light travels from the viewing target to the aperture of the optical assembly 505*a*, 505*b*, and is typically the longitudinal axis of the optical assembly 505*a*, 505*b*. The working distance of the optical assembly 505*a*, 505*b* is typically also measured along the optical axis. The positioning mechanism 520 may be used to control the lateral separation x between the optical axes of the optical assemblies 505*a*, 505*b*, and the angle θ between the optical axes of the optical assemblies 505*a*, 505*b* (FIG. 7).

Still referring to FIG. 6, where the optical axes are not parallel to each other, lateral separation between the optical axes may be measured as the lateral distance between the apertures of the optical assemblies 505*a*, 505*b*. The angle θ between the optical axes may be alternatively defined as the summation of respective angles $\theta_a$, $\theta_b$ of each optical axis relative to a common centerline CL of the imaging system 500. In some examples, the positioning mechanism 520 comprises separate mechanisms for controlling position and orientation of each optical assembly 505*a*, 505*b*. In some examples, the same positioning mechanism 520 may be used to control position and orientation of both optical assemblies 505*a*, 505*b*. The lateral separation and angle may be separately and independently controlled and may be controlled using separate positioning mechanisms 520 for lateral separation and for angular orientation.

Still referring to FIG. 6, operation of the optics in the first and second optical assemblies 505*a*, 505*b* may be controlled by a controller 530, e.g., a microprocessor, of the imaging system 500. The controller 530 may receive control input, e.g., from an external system, such as an external processor or an input device. The control input may direct the controller 530 to control the optical assemblies 505*a*, 505*b* in one of various possible modes of operation, as below further discussed. The controller 530 may directly control movement of the zoom optics 510*a*, 510*b* and/or the focus optics 515*a*, 515*b*, or the controller 530 may provide instructions to a respective sub-controller (not shown) of each optical assembly 505*a*, 505*b* to control the respective zoom optics 510*a*, 510*b* and/or focus optics 515*a*, 515*b*.

Still referring to FIG. 6, the controller 530 may also control the positioning mechanism 520 to control the relative position and orientation of the optical assemblies 505*a*, 505*b*. For example, the controller 530 may control the positioning mechanism 520 to position/orient only one of the optical assemblies 505*a*, 505*b*, each optical assembly

505*a*, 505*b* independently of the other, both optical assemblies 505*a*, 505*b* simultaneously and/or both optical assemblies 505*a*, 505*b* cooperatively, as below further discussed.

Still referring to FIG. 6, the imaging system 500 may also include first and second cameras 535*a*, 535*b*, e.g., high-definition (HD) cameras, for each respective optical assembly 505*a*, 505*b* to capture image data from the respective optical assembly 505*a*, 505*b*. The operation of the cameras 535*a*, 535*b* may be controlled by the controller 530. The cameras 535*a*, 535*b* may also output data to an external system, e.g., an external workstation or external output device, to view the captured image data. In some examples, the cameras 535*a*, 535*b* may output data to the controller 530, which in turn transmits the data to an external system for viewing. By providing image data to an external system for viewing, the captured images may be viewed on a larger display and may be displayed together with other information relevant to the medical procedure, e.g., a wide-field view of the surgical site, navigation markers, 3D images, etc.

Still referring to FIG. 6, the controller 530 may be coupled to a memory 550. The memory 550 may be internal or external of the imaging system 500. Data received by the controller 530, e.g., image data from the cameras 535*a*, 535*b*, may be stored in the memory 550. The memory 550 may also contain instructions to enable the controller to operate the positioning mechanism 520 and/or to control the zoom and focus of each optical assembly 505*a*, 505*b*. For example, the memory 550 may store instructions to enable the controller to control the optical assemblies 505*a*, 505*b* independently or cooperatively, as below further discussed.

Still referring to FIG. 6, the imaging system 500 may communicate with an external system, e.g., a navigation system or a workstation, via wired or wireless communication. In some examples, the imaging system 500 comprises a wireless transceiver (not shown) to enable wireless communication. An external processor, e.g., a processor of a workstation or the navigation system, in communication with the controller 530 may be used to provide control input to the controller 530. For example, the external processor may provide a graphical user interface via which the operator or an assistant may input instructions to control operation of the imaging system 500. The controller 530 may alternatively or additionally be in communication with an external input system, e.g., a voice recognition input system or a foot pedal.

Still referring to FIG. 6, in some examples, the imaging system 500 comprises a power source, e.g., a battery, or a connector to a power source, e.g., an AC adapter. In some examples, the imaging system 500 may receive power via a connection to an external system, e.g., an external workstation or processor. In some examples, the first and second optical assemblies 505*a*, 505*b* may be housed in a common housing (not shown). The housing may be sized to allow relative movement between the optical assemblies 505*a*, 505*b*, within preset boundaries. In some examples, other components of the imaging system 500 may also be housed in the same housing.

Still referring to FIG. 6, the imaging system 500 is mountable on a movable support structure, such as the positioning system, e.g., robotic arm, of a navigation system, a manually operated support arm, a ceiling mounted support, a movable frame, or other such support structure. The imaging system 500 may be removably mounted on the movable support structure. In some examples, the imaging system 500 comprises a support connector, e.g., a mechanical coupling, to enable the imaging system 500 to be quickly and easily mounted or dismounted from the support structure. The support connector on the imaging system 500 may be configured to be suitable for connecting with a typical complementary connector on the support structure, e.g., as designed for typical end effectors. In some examples, the imaging system 500 may be mounted to the support structure together with other end effectors or may be mounted to the support structure via another end effector.

Still referring to FIG. 6, when mounted, the imaging system 500 may be at a known fixed position and orientation relative to the support structure, e.g., by calibrating the position and orientation of the imaging system 500 after mounting. In this way, by determining the position and orientation of the support structure, e.g., using a navigation system or by tracking the movement of the support structure from a known starting point, the position and orientation of the imaging system 500 may also be determined. In some examples, the imaging system 500 comprises a manual release button that, when actuated, enables the imaging system 500 to be manually positioned, e.g., without software control by the support structure.

Referring back to FIGS. 1-7, as discussed above, the two optical assemblies of the imaging system may be controlled independently or cooperatively. The magnification and focus of each optical assembly may similarly be controlled independently or cooperatively between the optical assemblies. The imaging system may operate in one of several modes: for example, independent mode, dual-FOV mode, stereoscopic mode, and depth map mode. The imaging system may receive control input from an external system or from an input mechanism to select the mode of operation and to switch between different modes of operation. The surgeon or other operator may control the imaging system to switch between different modes of operation intraoperatively.

Referring back to FIGS. 1-7, in the independent mode, the controller may control each optical assembly independently, such that the two optical assemblies may function similarly to two separate microscopes and may capture images of different target objects. The controller may control the zoom and focus optics of each optical assembly independently, in response to control input. Each optical assembly may also be positioned and oriented independently of each other (within the constraint that the optical assemblies should not collide with each other), in order to capture different FOVs, for example. The cameras associated with each optical assembly may also operate independently. Image data from each optical assembly may be communicated separately and may be displayed separately. For example, the first optical assembly and first camera may capture images of a first target, and this image data may be communicated to a desktop computer for display on a desktop display; the second optical assembly and second camera may capture images of a second target, and this image data may be communicated to a projection device for display on a projection screen. In some examples, the captured images may be displayed side-by-side on the same display device. The controller of the imaging system may manage and route the image data accordingly, in response to the operator's control input.

Still referring back to FIGS. 1-7, in the dual-FOV mode, the optical assemblies may be controlled to view the same target object. However, the zoom optics of each optical assembly may be controlled separately such that the first optical assembly provides a FOV that is different from the FOV of the second optical assembly. Each optical assembly may thus provide a respective two-dimensional (2D) view of the target object, but with different FOVs. For example, the first optical assembly may provide a larger FOV than the second optical assembly, and the FOV provided by the second optical assembly may fall entirely within the FOV of the first optical assembly. The FOV of each optical assembly may be controlled independently, in response to control input. The surgeon may control the imaging system to focus on a certain target object and may select the zoom or FOV size for each optical assembly. As the imaging system is controlled to view different viewing targets, each optical assembly may change its focus accordingly, while maintaining the respective selected zoom.

Still referring back to FIGS. 1-7, in some examples, the zoom or FOV size for each optical assembly may be selected by specifying a relative difference between the zooms or FOV sizes, e.g., presetting that one FOV should be twice the magnification of the other FOV); and/or may be selected by specifying the zoom or FOV size explicitly, e.g., in percentage magnification. Since the FOV of each optical assembly may be controlled independently, one FOV may be fixed while the other is varied, the two FOVs may be the same, and the optical assemblies may switch between having larger or smaller FOVs between the two, for example. The use of the dual-FOV mode may provide the surgeon with a magnified view of the surgical target while simultaneously providing the surgeon with a wider contextual view of the surgical field. Similarly, to the independent mode, the image data captured by the first and second cameras may be displayed separately or side-by-side, for example.

Still referring back to FIGS. 1-7, in some examples, 3D images may be obtained using the dual-FOV mode. For example, where the FOV of the first optical assembly overlaps with or entirely includes the FOV of the second optical assembly, both sets of image data may be communicated to an external system, e.g., an image viewing workstation. The external system may determine the image portion that is common between the two FOVs and may generate a 3D image, e.g., using appropriate 3D image rendering techniques, using the two sets of image data, for this common image portion.

Still referring back to FIGS. 1-7, in the stereoscopic mode, the optical assemblies may be controlled to view the same target object using the same FOV. Because of the separation of the optical assemblies, the result is that the two optical assemblies may cooperate together to function similarly to a stereoscopic microscope, with the cameras of each optical assembly being used to capture a respective one of a pair of stereo images. The surgeon may control the imaging system to focus on a certain target object at a certain FOV. As the imaging system is controlled to view different viewing targets, each optical assembly may change its focus accordingly so that they continue to focus on a common viewing target. The surgeon may control the imaging system to change the zoom or FOV, and each optical assembly may adjust its zoom accordingly. The image data captured by the first and second cameras may be communicated to an external system, e.g., an image viewing workstation that may use the two sets of data to generate a 3D image, e.g., using appropriate 3D rendering techniques. The 3D image may be presented as a rendered 3D model on a conventional 2D display, and/or may be viewed as a 3D image using 3D viewing technology, e.g., requiring the use of 3D glasses. The 3D image may be provided as part of an augmented reality display, for example. In some examples, the imaging system in the stereoscopic mode may operate similarly to the dual-FOV mode, with the difference that the two optical assemblies share the same FOV.

Still referring back to FIGS. 1-7, in some examples, the image data captured using the disclosed imaging system may be used for an augmented reality display. Using augmented reality, video information captured by the imaging system may be displayed together with images from other imaging modalities, e.g., intraoperative imaging modalities such as optical coherence tomography (OCT), ultrasound, fluorescence imaging and elastography, or preoperative imaging modalities, such as MRI, CT, PET, functional MRI (fMRI), and diffusion tensor imaging (DTI). The image information captured from both optical assemblies may be at the same level of magnification to provide a 3D stereoscopic view of the target, e.g., as described above, or at different levels of magnification to provide different FOVs, for example. When different FOVs are provided, using augmented reality to superimpose anatomical structures on the narrower FOV may help the surgeon to reduce or avoid the risk of damaging brain cells while a wider FOV overlay may provide information to help enhance the surgeon's understanding of the spatial relationship between different structures and their functional status.

Still referring back to FIGS. 1-7, unlike conventional stereoscopic microscopes, the disclosed imaging system allows for the lateral separation of the optical assemblies to be adjusted. Since there is a relationship between lateral stereo separation and working distance, the ability of the disclosed imaging system to dynamically adjust lateral separation may provide for a more comfortable viewing experience, e.g., enabling more comfortable viewing of 3D images, with less eye strain and/or headaches, for example, by more accurately mimicking the natural separation between the viewer's eyes.

Still referring back to FIGS. 1-7, in the depth map mode, each optical assembly may be used to view a different depth of field, while focused on the same target object and in the same FOV. For example, the first optical assembly may provide a greater depth of field, e.g., 1 cm, than the second optical assembly, e.g., 1 mm. The second optical assembly may be controlled to automatically move through the depth range of the first optical assembly to capture images at different depths, e.g., at increments of 1 mm, through the depth range. The image data captured by the second optical assembly at different depths may be transmitted, together with the image data captured by the first optical assembly, to an external system, e.g., an image viewing workstation. The image data from the second optical assembly at different depths may be aggregated into a set of depth images to form a depth map for the same FOV as the image data from the first optical assembly. The depth map may provide focused views of the FOV, at different depths, and comprises contours, color-coding and/or other indicators of different depths. Image processing may be performed to generate a pseudo 3D image, for example, by visually encoding, e.g., using color, artificial blurring or other visual symbols, different parts of the captured image according to the depth information. The external system may provide a user interface that allows a user to navigate through the depth map, for example.

Still referring back to FIGS. 1-7, in some examples, a depth map may be generated by comparing image information from two different vantage points coming from the two optical assemblies. The apparent pixel difference between these two images, also referred to as a disparity map, may be used to generate a depth map. Examples of the present disclosure may enable different viewing modes, e.g., stereoscopic mode and dual-FOV mode, to be implemented using a single imaging system, without having to switch between different imaging systems. An operator may conveniently switch between the different modes depending on the desired imaging. Although the above examples describe the use of an external system such as an image viewing workstation for processing image data from the imaging system, in some examples some or all of the image processing may be performed by the controller of the imaging system itself.

Still referring back to FIGS. 1-7, generally, when operating in the independent mode, the controller of the imaging system may control the optical assemblies in an uncoupled configuration, where each optical assembly is controlled entirely independently of the other. When in the uncoupled configuration, the positioning mechanism may mechanically uncouple the optical assemblies from each other. In some examples where there are separate positioning mechanisms for each optical assembly, the positioning mechanisms may simply operate independently.

Still referring back to FIGS. 1-7, when operating in the dual-FOV mode, the stereoscopic mode or the depth map mode, the controller may control the optical assemblies in a coupled configuration, where the focus and/or zoom of one optical assembly is dependent on that of the other, and where the position and/or orientation of one optical assembly is dependent on that of the other. For example, the optical axes and/or focus optics of each optical assembly may be adjusted so that a common focus is maintained even as the viewing target is moved, or as the working distance is adjusted. When in the coupled configuration, the positioning mechanism may serve to mechanically couple the optical assemblies to each other.

Still referring back to FIGS. 1-7, in some examples, the disclosed imaging system may be used with a navigation system, e.g., as above described. The navigation system may provide tracking of a viewing target, e.g., by tracking a pointer tool or other medical instrument, and the controller may control the imaging system to automatically adjust focus to follow the tracked target. The navigation system may also provide information to help with positioning of the imaging system relative to the tracked target, e.g., using a robotic positioning system.

Figure 8A:
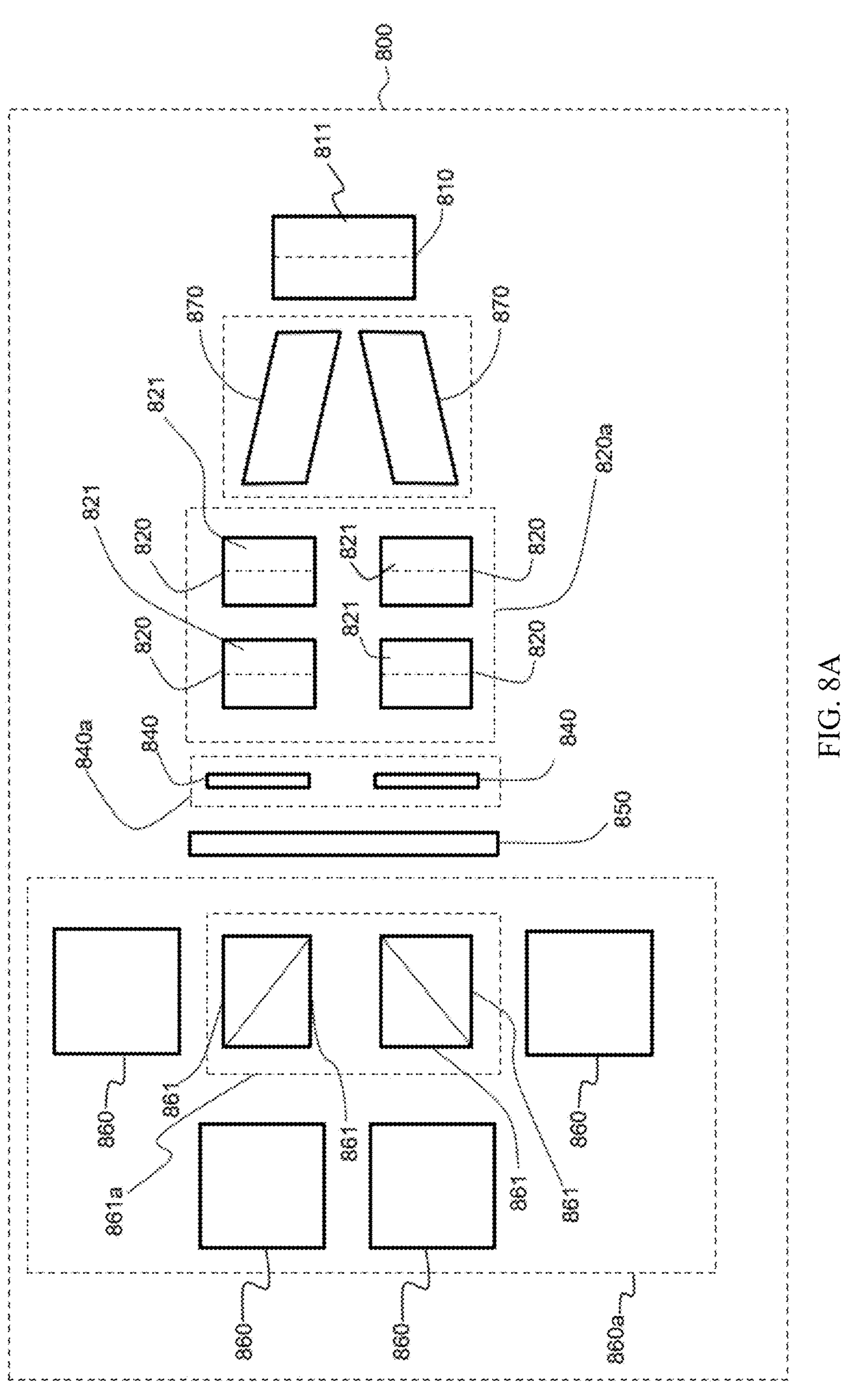
FIG. 8A is a schematic diagram illustrating an imaging system comprising a videoscope.

Referring to FIG. 8A, this schematic diagram illustrates an imaging system S, in accordance with an embodiment of the present disclosure. The imaging system S comprises a videoscope 800, the videoscope 800 comprising: a plurality of cameras 860, each camera 860 of the plurality of cameras 860 configured to receive light; a filter feature 850 in optical communication with the plurality of cameras 860, the filter feature 850 configured to one of independently filter and tandemly filter the light from each camera 860 of the plurality of cameras 860, whereby filtered light is provided; at least one independently adjustable aperture 840 in optical communication with the filter feature 850, the at least one independently adjustable aperture 840 configured to limit transmission of the filtered light, whereby independently limited filtered light is provided; a plurality of independently adjustable zoom features 820 in optical communication with the at least one independently adjustable aperture 840, the plurality of independently adjustable zoom features 820 comprising a corresponding plurality of independently adjustable zoom channels 821, and each independently adjustable zoom feature 820 of the plurality of independently adjustable zoom features 820 configured to independently zoom the independently limited filtered light, whereby independently zoomed, independently limited, filtered light is provided; at least one prism 870 in optical communication with the plurality of independently adjustable zoom channels 821, the at least one prism 870 configured to redirect the independently zoomed, independently limited, filtered light, whereby redirected, independently zoomed, independently limited, filtered light is provided; and a shared focus feature 810 in optical communication with the at least one prism 870, the shared focus feature 810 comprising a shared focus channel 811, and the shared focus feature 810 configured to focus the redirected, independently zoomed, independently limited, filtered light, whereby focused, redirected, independently zoomed, independently limited, filtered light is provided.

Figure 8B:
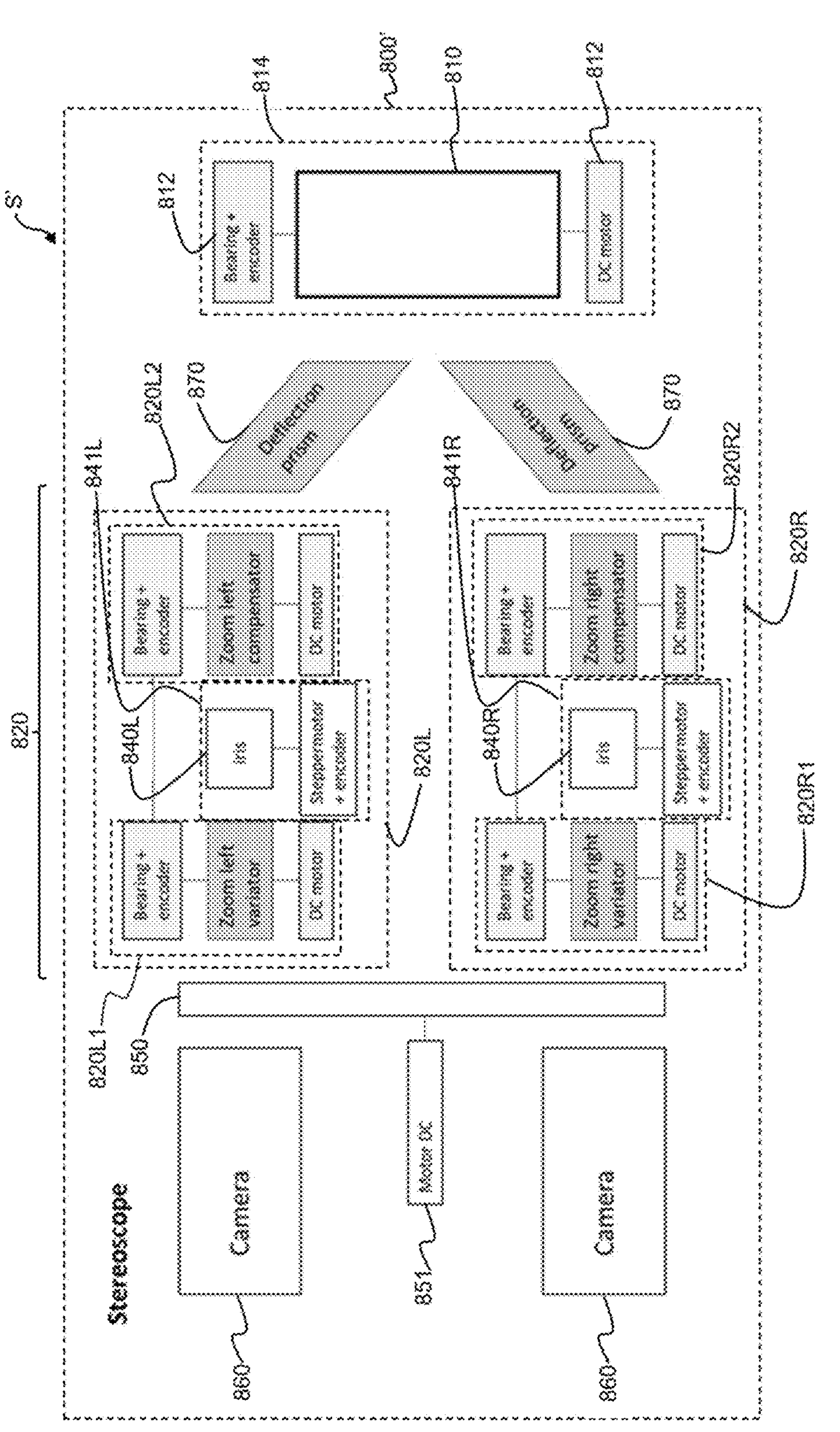
FIG. 8B is a schematic diagram illustrating an alternative imaging system.

Still referring to FIG. 8A, the imaging system S further comprises a plurality of beam splitters 861, each beam splitter 861 of the plurality of beam splitters 861 configured to split the light from at least two cameras 860 of the plurality of cameras 860, whereby split light is provided. The plurality of independently adjustable zoom channels 821 comprises a plurality of independently adjustable stereo channels. Each independently adjustable zoom channel 821 is coupled with at least one camera 860. The plurality of independently adjustable zoom features 820 comprises at least one of a plurality of independently adjustable lenses (not shown) and a combination of an independently adjustable left zoom feature (FIG. 8B) and an independently adjustable right zoom feature (FIG. 8B). The filter feature 850 comprises at least one of a shared filter wheel (not shown), a shared carousel (not shown), and a shared slider (not shown). The at least one independently adjustable aperture 840 comprises an iris. The at least one prism 870 comprises a deflection prism. The plurality of independently adjustable zoom features 820 is disposed in a zoom arrangement 820*a*.

Referring to FIG. 8B, this schematic diagram illustrates an imaging system S', in accordance with an alternative embodiment of the present disclosure. The imaging system S' comprises a videoscope 800', the videoscope 800' comprising: a plurality of cameras 860, each camera 860 of the plurality of cameras 860 configured to receive light; and a filter feature 850 in optical communication with the plurality of cameras 860, the filter feature 850 configured to one of independently filter and tandemly filter the light from each camera 860 of the plurality of cameras 860, the filter feature 850 configured to operate with a motor 851, e.g., a direct current (DC) motor, whereby filtered light is provided. The imaging system S' further comprises a plurality of independently adjustable zoom features 820 in optical communication with the filter feature 850, the plurality of independently adjustable zoom features 820 comprising a left independently adjustable zoom assembly 820L and a right independently adjustable zoom assembly 820R.

Still referring to FIG. 8B, in the system S', by example only, the left independently adjustable zoom assembly 820L comprises a first left independently adjustable zoom subassembly 820L1 and a second left independently adjustable zoom subassembly 820L2; and right independently adjustable zoom assembly 820R comprises a left right independently adjustable zoom subassembly 820R1 and a second right independently adjustable zoom subassembly 820R2. The system S' further comprises at least one independently adjustable aperture 840 in optical communication with the plurality of independently adjustable zoom features 820, such as a left independently adjustable aperture 840L in optical communication with the first left independently adjustable zoom subassembly 820L1 and the second left independently adjustable zoom subassembly 820L2 and a right independently adjustable aperture 840L in optical communication with the first right independently adjustable zoom subassembly 820R1 and the second independently adjustable zoom subassembly 820R2. Each of the first left independently adjustable zoom subassembly 820L1, the second left independently adjustable zoom subassembly

820L2, the first right independently adjustable zoom subassembly 820R1, and the second independently adjustable zoom subassembly 820R2 further comprise at least one of a respective bearing-encoder combination and a motor, e.g., a direct current (DC) motor.

Still referring to FIG. 8B, in the system S', by example only, the first left independently adjustable zoom subassembly 820L1 and the second left independently adjustable zoom subassembly 820L2 are operable with a left step-motor/encoder combination 840L; and the first right independently adjustable zoom subassembly 820R1 and the second right independently adjustable zoom subassembly 820R2 are operable with a right step-motor/encoder combination 840LR. The at least one independently adjustable aperture 840 is configured to limit transmission of the filtered light, whereby independently limited filtered light is provided. The left independently adjustable zoom assembly 820L further comprises the left step-motor/encoder combination 840L. The left independently adjustable aperture 840L and the left step-motor/encoder combination 840L, together, form a left aperture arrangement 841L. The right independently adjustable zoom assembly 820R further comprises the right step-motor/encoder combination 840R. The right independently adjustable aperture 840R and the right step-motor/encoder combination 840R, together form a right aperture arrangement 841R.

Still referring to FIG. 8B, in the system S' further comprises at least one prism 870, such as at least one deflection prism, in optical communication with the plurality of independently adjustable zoom features 820, the at least one prism 870 configured to redirect the independently zoomed, independently limited, filtered light, whereby redirected, independently zoomed, independently limited, filtered light is provided. By example only, the at least one prism 870 comprises a left prism 870L in optical communication with the left independently adjustable zoom assembly 820L and a right prism 870R in optical communication with the right independently adjustable zoom assembly 820R. The system S' further comprises a shared focus feature 810 in optical communication with the at least one prism 870, the shared focus feature 810 comprising a shared focus channel 811, and the shared focus feature 810 configured to focus the redirected, independently zoomed, independently limited, filtered light, whereby focused, redirected, independently zoomed, independently limited, filtered light is provided. The shared focus feature 810 is operable with at least one of a bearing encoder 812 and a motor 813, e.g., a DC motor. By example only, the shared focus feature 810 comprises a focus lens; and the shared focus feature 810, the bearing-encoder combination 812, and a motor 813, together, forming a focus arrangement 814.

Figure 9A:
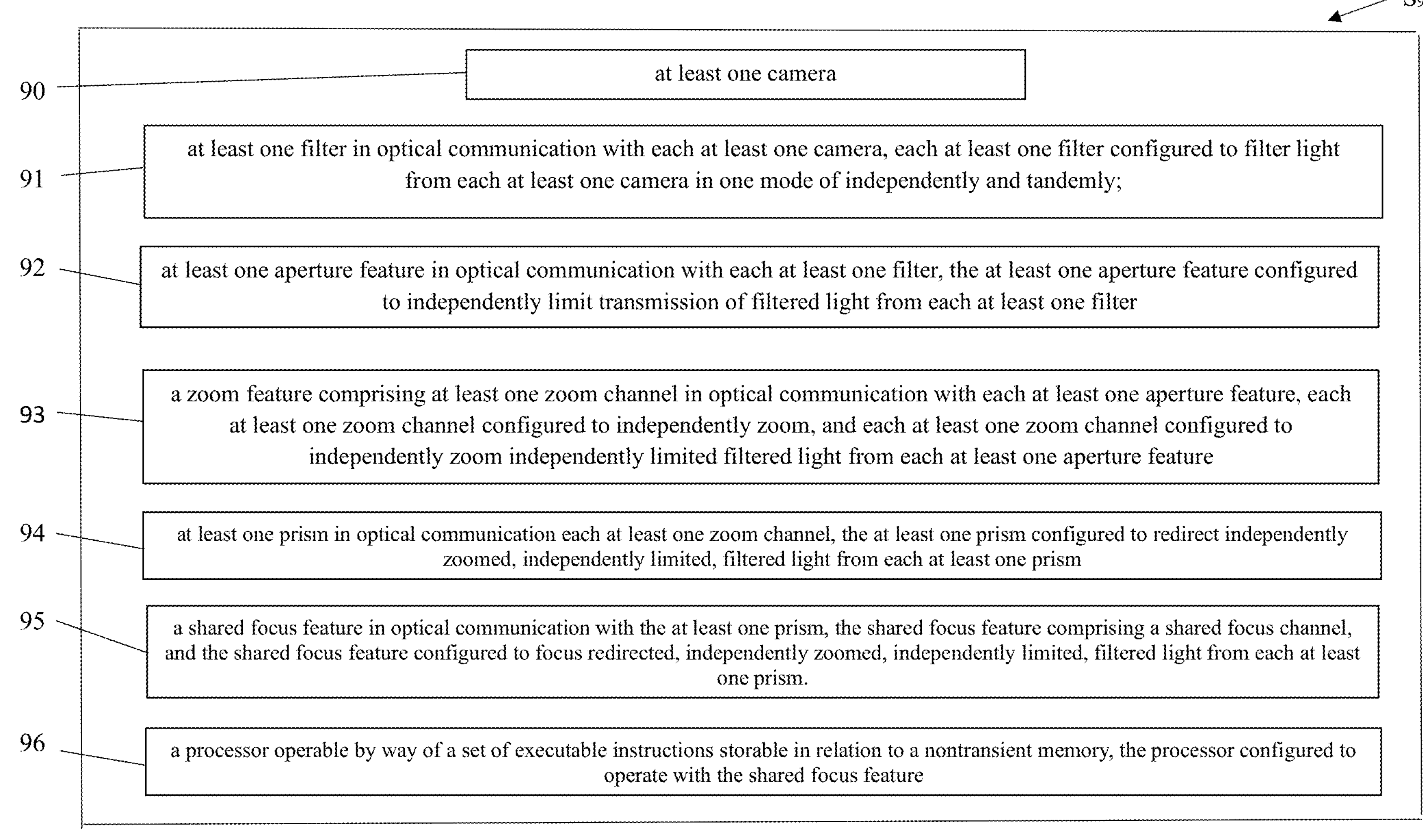
FIG. 9A is a diagram illustrating an imaging system for simultaneously visualizing each fluorophore of a plurality of fluorophores disposed in a spatial distribution.

Referring to FIGS. 9A, this diagram illustrates an imaging system $S_9$ for simultaneously visualizing each fluorophore of a plurality of fluorophores disposed in a spatial distribution, in accordance with an embodiment of the present disclosure. By example only, the imaging system $S_9$ comprises: at least one camera 90; at least one filter 91 in optical communication with each at least one camera 90, each at least one filter 91 configured to filter light from each at least one camera 90 in one mode of independently and tandemly; at least one aperture feature 93 in optical communication with each at least one filter 91, the at least one aperture feature 92 configured to independently limit transmission of filtered light from each at least one filter 91; a zoom feature 93 comprising at least one zoom channel 93*c* in optical communication with each at least one aperture feature 93, each at least one zoom channel 93*c* configured to independently zoom, and each at least one zoom channel 93*c* configured to independently zoom independently limited filtered light from each at least one aperture feature 93; at least one prism 94 in optical communication each at least one zoom channel 93*c*, the at least one prism 95 configured to redirect independently zoomed, independently limited, filtered light from each at least one prism 94; and a shared focus feature 95 in optical communication with the at least one prism 94, the shared focus feature 95 comprising a shared focus channel 95*a*, and the shared focus feature 95 configured to focus redirected, independently zoomed, independently limited, filtered light from each at least one prism 94.

Still referring back to FIG. 9A, the imaging system $S_9$ further comprises a processor 96 operable by way of a set of executable instructions storable in relation to a nontransient memory, e.g., a memory device, the processor 96 configured to operate with the shared focus feature 95. The set of executable instructions comprise an instruction for applying Boolean logic to data relating to each fluorophore of a plurality of fluorophores disposed in a spatial distribution, wherein combined data relating to at least one fluorophore, detected in each pixel of a plurality of pixels in an image, is used to indicate of a state of tissue, e.g., by an instruction for analyzing the combined data for each pixel of the plurality of pixels in the image.

Figure 9B:
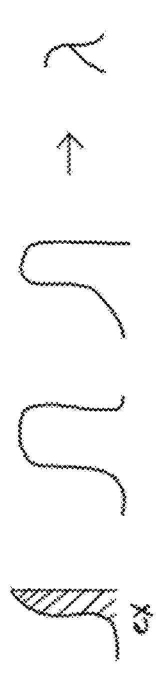
FIG. 9B is a diagram illustrating a technique for simultaneous visualization of each fluorophore, the spatial distribution of the plurality of fluorophores, each of which is separately visualized by fusing the interdependently acquired images and applying a distinct colour to each fluorophore, wherein examples of various tissue states are shown.
Figure 9B:
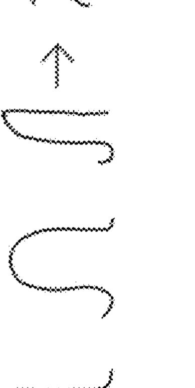
Figure 9B:
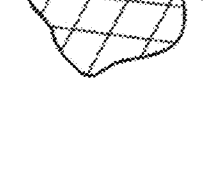
Figure 9B:
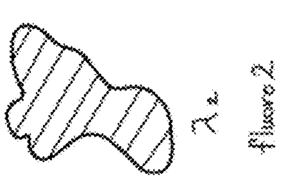
Figure 9B:
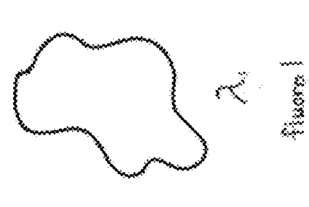
Figure 9B:
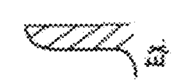
Figure 9C:
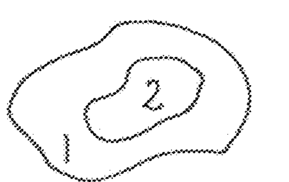
FIG. 9C is a diagram illustrating a technique for simultaneous visualization of each fluorophore, the spatial distribution of the plurality of fluorophores is separately visualized by fusing the interdependently acquired images and applying a distinct colour to each fluorophore, wherein examples of applied Boolean logic are shown.
Figure 9C:
Figure 9C:
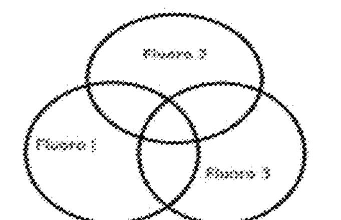

Referring to FIGS. 9B and 9C, together, these diagrams illustrate a technique for simultaneous visualization of each fluorophore, the spatial distribution of the plurality of fluorophores is separately visualized by fusing the interdependently acquired images and applying a distinct colour to each fluorophore, in accordance with an embodiment of the present disclosure. The distribution of each fluorophore could allow for Boolean logic on the fluorescence singles where the combination of fluorophores detected in each pixel is indicative of the state of the tissue. For example, the Boolean logic may be applied as follows to indicate various tissue states: “Fluorophore 1” AND “Fluorophore 2”=“State 1,” “Fluorophore 1” AND “Fluorophore 2” AND “Fluorophore 3”=“State 2,” and “Fluorophore 1” NOT “Fluorophore 2”=“State 3.” These tissue states may provide information to facilitate diagnostics. For example, various tissue states may indicate the following conditions: high grade tumour, low grade tumour, infiltrating tumour, healthy, etc.

Figure 10:
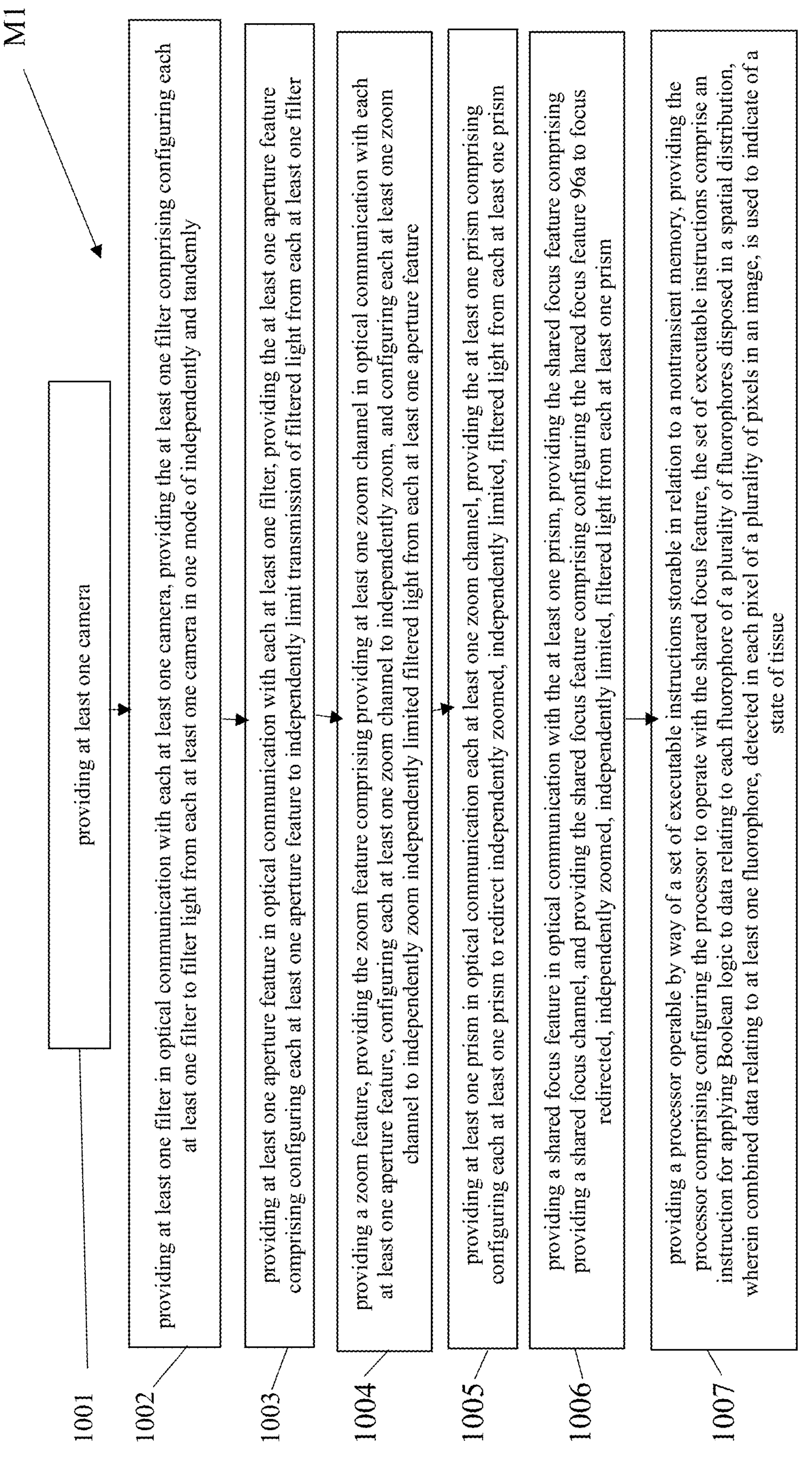
FIG. 10 is a flow diagram illustrating a method of providing an imaging system for simultaneously visualizing each fluorophore of a plurality of fluorophores disposed in a spatial distribution.

Referring to FIG. 10, this flow diagram illustrates a method $M_1$ of providing an imaging system $S_9$ for simultaneously visualizing each fluorophore of a plurality of fluorophores disposed in a spatial distribution, in accordance with an embodiment of the present disclosure. The method $M_1$ comprises: providing at least one camera 90, as indicated by block 1001; providing at least one filter 91 in optical communication with each at least one camera 90, providing the at least one filter 91 comprising configuring each at least one filter 91 to filter light from each at least one camera 90 in one mode of independently and tandemly as indicated by block 1002; providing at least one aperture feature 92 in optical communication with each at least one filter 91, providing the at least one aperture feature 92 comprising configuring each at least one aperture feature 92 to independently limit transmission of filtered light from each at least one filter 91 as indicated by block 1003; providing a zoom feature 93, providing the zoom feature 93 comprising providing at least one zoom channel 93*c* in optical communication with each at least one aperture feature 92, configuring each at least one zoom channel 93*c* to independently zoom, and configuring each at least one zoom channel 93*c* to independently zoom independently limited filtered light from each at least one aperture feature 92 as indicated by block 1004; providing at least one prism 94 in optical communication each at least one zoom channel 93*c*, providing the at least one prism 94 comprising configuring each at least one prism 94 to redirect independently zoomed, independently limited, filtered light from each at least one prism 94 as indicated by block 1005; and providing a shared focus feature 95 in optical communication with the at least one prism 94, providing the shared focus feature 95 comprising providing a shared focus channel 95*a*, and providing the shared focus feature 95 comprising configuring the shared focus feature 95 to focus redirected, independently zoomed, independently limited, filtered light from each at least one prism 94, as indicated by block 1006.

Still referring to FIG. 10, the method $M_1$ further comprises providing a processor 96 operable by way of a set of executable instructions storable in relation to a nontransient memory, e.g., a memory device, providing the processor 96 comprising configuring the processor 96 to operate with the shared focus feature 95, as indicated by block 1007. The set of executable instructions comprise an instruction for applying Boolean logic to data relating to each fluorophore of a plurality of fluorophores disposed in a spatial distribution, wherein combined data relating to at least one fluorophore, detected in each pixel of a plurality of pixels in an image, is used to indicate of a state of tissue, e.g., by an instruction for analyzing the combined data for each pixel of the plurality of pixels in the image.

Figure 11:
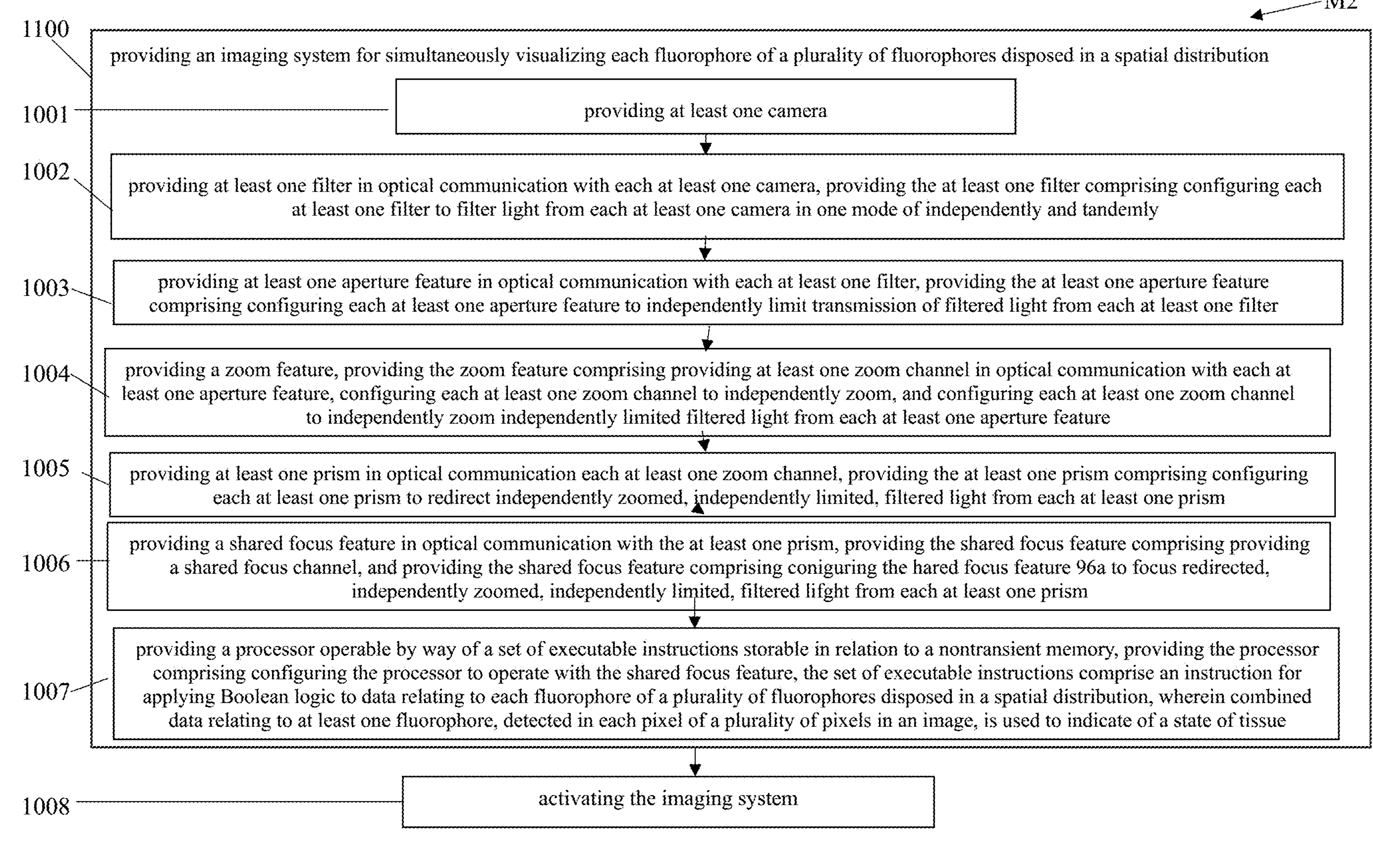
FIG. 11 is a flow diagram illustrating a method of simultaneously visualizing each fluorophore of a plurality of fluorophores disposed in a spatial distribution by way of an imaging system.

Referring to FIG. 11, this flow diagram illustrates a method $M_2$ of simultaneously visualizing each fluorophore of a plurality of fluorophores disposed in a spatial distribution by way of an imaging system $S_9$. The method $M_2$ comprises: providing an imaging system $S_9$ for simultaneously visualizing each fluorophore of a plurality of fluorophores disposed in a spatial distribution, as indicated by block 1100, providing the imaging system $S_9$ comprising: providing at least one camera 90, as indicated by block 1101; providing at least one filter 91 in optical communication with each at least one camera 90, providing the at least one filter 91 comprising configuring each at least one filter 91 to filter light from each at least one camera 90 in one mode of independently and tandemly as indicated by block 1102; providing at least one aperture feature 92 in optical communication with each at least one filter 92, providing the at least one aperture feature 92 comprising configuring each at least one aperture feature 92 to independently limit transmission of filtered light from each at least one filter 91 as indicated by block 1103; providing a zoom feature 93, providing the zoom feature 93 comprising providing at least one zoom channel 93*c* in optical communication with each at least one aperture feature 93, configuring each at least one zoom channel 93*c* to independently zoom, and configuring each at least one zoom channel 93*c* to independently zoom independently limited filtered light from each at least one aperture feature 92 as indicated by block 1104; providing at least one prism 94 in optical communication each at least one zoom channel 93*c*, providing the at least one prism 95 comprising configuring each at least one prism 94 to redirect independently zoomed, independently limited, filtered light from each at least one prism 94 as indicated by block 1105; and providing a shared focus feature 95 in optical communication with the at least one prism 94, providing the shared focus feature 95 comprising providing a shared focus channel 95*a*, and providing the shared focus feature 95 comprising configuring the shared focus feature 95 to focus redirected, independently zoomed, independently limited, filtered light from each at least one prism 94, as indicated by block 1106; and activating the imaging system S9, as indicated by block 1108.

Still referring to FIG. 11, the method $M_2$ further comprises providing a processor 96 operable by way of a set of executable instructions storable in relation to a nontransient memory, e.g., a memory device, providing the processor 96 comprising configuring the processor 96 to operate with the shared focus feature 95, as indicated by block 1107. The set of executable instructions comprise an instruction for applying Boolean logic to data relating to each fluorophore of a plurality of fluorophores disposed in a spatial distribution, wherein combined data relating to at least one fluorophore, detected in each pixel of a plurality of pixels in an image, is used to indicate of a state of tissue, e.g., by an instruction for analyzing the combined data for each pixel of the plurality of pixels in the image.

Still referring to FIG. 11, in the method $M_2$, fluorophores that may be used in neurosurgery are 5-Aminolevulinic acid (5-ALA/PPIX), sodium fluorescein, and Indocyanine green (ICG). Discrete fluorescence excitation sources (e.g., discrete LEDs or lasers) can be used to excite each fluorophore individually. Each fluorophore could be visualized separately if they are sufficiently separated in wavelength, e.g., PPIX, fluorescein, and ICG, such that each fluorophore can be detected in a distinct channel of the camera, e.g., 4MOS camera with Blue, Green, Red, and IR channels, and such that excitation filters do not block other fluorophore emissions (as would be the case for PPIX, fluorescein, and ICG).

Although the above discussion refers to the surgeon as being the user who controls and uses the examples of the present disclosure, the present disclosure is not limited to any specific user. In some examples, there may be a plurality of users involved. While some embodiments or aspects of the present disclosure may be implemented in fully functioning computers and computer systems, other embodiments or aspects may be capable of being distributed as a computing product in a variety of forms and may be capable of being applied regardless of the particular type of machine or computer readable media used to actually effect the distribution.

At least some aspects disclosed may be embodied, at least in part, in software. That is, some disclosed techniques and methods may be carried out in a computer system or other data processing system in response to its processor, such as a microprocessor, executing sequences of instructions contained in a memory, such as ROM, volatile RAM, non-volatile memory, cache, or a remote storage device.

A computer readable storage medium may be used to store software and data which when executed by a data processing system causes the system to perform various methods or techniques of the present disclosure. The executable software and data may be stored in various places including for example ROM, volatile RAM, non-volatile memory and/or cache. Portions of this software and/or data may be stored in any one of these storage devices.

Examples of computer-readable storage media comprises, but are not limited to, recordable and non-recordable type media such as volatile and non-volatile memory devices, read only memory (ROM), random access memory (RAM), flash memory devices, floppy and other removable disks, magnetic disk storage media, optical storage media, e.g., compact discs (CDs), digital versatile disks (DVDs), etc., among others. The instructions can be embodied in digital and analog communication links for electrical, optical, acoustical, or other forms of propagated signals, such as carrier waves, infrared signals, digital signals, and the like.

The storage medium may be the internet cloud, or a computer readable storage medium such as a disc.

Furthermore, at least some of the methods described herein may be capable of being distributed in a computer program product comprising a computer readable medium that bears computer usable instructions for execution by one or more processors, to perform aspects of the methods described. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer usable instructions may also be in various forms, including compiled and non-compiled code.

At least some of the elements of the systems described herein may be implemented by software, or a combination of software and hardware. Elements of the system that are implemented via software may be written in a high-level procedural language such as object oriented programming or a scripting language. Accordingly, the program code may be written in C, C++, J++, or any other suitable programming language and may comprise modules or classes, as in object-oriented programming. At least some of the elements of the system that are implemented via software may be written in assembly language, machine language or firmware as needed. In either case, the program code can be stored on storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, 0 and predefined manner in order to perform at least one of the methods herein described.

While the teachings described herein are in conjunction with various embodiments for illustrative purposes, it is not intended that the teachings be limited to such embodiments. On the contrary, the teachings described and illustrated herein encompass various alternatives, combinations, permutations, modifications, and equivalents, without departing from the described embodiments, the general scope of which is defined in the appended claims Except to the extent necessary or inherent in the processes themselves, no particular order of steps or stages of methods or processes described in this disclosure is intended or implied. In many cases, the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments; and the claims are not limited by anything other than their subject matter, wherein any reference to an element being made in the singular is not intended to denote "one and only one" unless explicitly so stated, but rather to denote "at least one" or "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for such to be encompassed by the present claims. Furthermore, no element, component, or method step in the present disclosure is intended to be dedicated to the public, regardless of whether the element, component, or method step is explicitly recited in the claims. However, that various changes and modifications in form, material, workpiece, and fabrication material detail may be made, without departing from the spirit and scope of the present disclosure, as set forth in the appended claims, are also encompassed by the present disclosure. In addition, any combination or permutation of any feature, as herein explicitly and/or implicitly disclosed, is also encompassed by the present disclosure.

What is claimed:

1. An imaging system for simultaneously visualizing each fluorophore of a plurality of fluorophores disposed in a spatial distribution, the system comprising:

at least one camera comprising a multi-channel image sensor configured to detect each fluorophore in a distinct channel;

at least one filter in optical communication with each at least one camera, each at least one filter configured to filter light from each at least one camera in one mode of independently and tandemly;

at least one aperture feature in optical communication with each at least one filter, the at least one aperture feature configured to independently limit transmission of filtered light from each at least one filter;

a zoom feature comprising at least one zoom channel in optical communication with each at least one aperture feature, each at least one zoom channel configured to independently zoom, and each at least one zoom channel configured to independently zoom independently limited filtered light from each at least one aperture feature;

at least one prism in optical communication each at least one zoom channel, the at least one prism configured to redirect independently zoomed, independently limited, filtered light from each at least one prism; and a shared focus feature in optical communication with the at least one prism, the shared focus feature comprising a shared focus channel, and the shared focus feature configured to focus redirected, independently zoomed, independently limited, filtered light; and a processor operable by executable instructions, the processor configured to:

fuse interdependently acquired images corresponding to the distinct channels, and apply a distinct color to each fluorophore to produce a composite display; and apply Boolean logic to per-pixel fluorophore data such that a combination of fluorophores detected in a pixel is indicative of a tissue state, and output an indication of the tissue state for display.

2. The system of claim 1, wherein the processor applies the Boolean logic using at least one of AND, OR, and NOT operations.

3. The system of claim 1, wherein the Boolean logic maps at least one fluorophore combination to at least one of: high grade tumour, low grade tumour, infiltrating tumour, or healthy tissue.

4. The system of claim 1, further comprising discrete fluorescence excitation sources configured to excite each fluorophore individually.

5. The system of claim 4, wherein the discrete fluorescence excitation sources comprise discrete LEDs or lasers.

6. The system of claim 1, wherein the plurality of fluorophores includes at least one of 5-ALA/PPIX, sodium fluorescein, or indocyanine green (ICG).

7. The system of claim 1, wherein the imaging system is a videoscope usable intraoperatively to observe a surgical site.

8. A method of providing an imaging system for simultaneously visualizing white light and visible fluorescent light, the method comprising providing an imaging system comprising at least one camera, filter and prism and configuring a processor to:

fuse interdependently acquired fluorophore images and apply a distinct color to each fluorophore; and apply Boolean logic to per-pixel fluorophore data such that a combination of fluorophores detected in each pixel indicates a tissue state.

9. The method of claim 8, wherein the camera detects the fluorophores in distinct channels of a multi-channel camera.

10. The method of claim 8, further comprising providing discrete excitation sources to excite each fluorophore individually.

11. The method of claim 8, wherein the Boolean logic applies at least one of: ("Fluorophore 1" AND "Fluorophore 2"), ("Fluorophore 1" AND "Fluorophore 2" AND "Fluorophore 3"), or ("Fluorophore 1" NOT "Fluorophore 2").

12. The method of claim 8, wherein the processor outputs the tissue state as a diagnostic indicator.

13. The method of claim 8, wherein the fusing comprises generating a composite image in which each fluorophore is visually distinguishable by the distinct color.

14. The method of claim 8, wherein the imaging system is used intraoperatively during a medical procedure.

15. A method of simultaneously visualizing each fluorophore of a plurality of fluorophores disposed in a spatial distribution, the method comprising:

acquiring, with a multi-channel camera, fluorescence image data for the plurality of fluorophores in distinct channels;

fusing interdependently acquired images corresponding to the distinct channels;

applying a distinct color to each fluorophore to generate a composite display; and applying Boolean logic to per-pixel fluorophore data so that a combination of fluorophores detected in a pixel indicates a tissue state, and displaying an indication of the tissue state.

16. The method of claim 15, wherein the tissue state includes at least one of high grade tumour, low grade tumour, infiltrating tumour, or healthy tissue.

17. The method of claim 15, wherein each fluorophore is excited by a respective discrete excitation source.

18. The method of claim 15, wherein each fluorophore is selected from PPIX, fluorescein, and ICG.

19. The method of claim 15, wherein excitation filters are configured such that excitation does not block emissions of at least one other fluorophore.

20. The method of claim 15, wherein the distinct channels include Blue, Green, Red, and IR channels.

* * * * *